(12) United States Patent
McAuley et al.

(10) Patent No.: US 9,076,196 B2
(45) Date of Patent: Jul. 7, 2015

(54) IRON QUANTIFICATION OF BRAIN MICROBLEEDS

(75) Inventors: Grant A. McAuley, Loma Linda, CA (US); Matthew Schrag, Loma Linda, CA (US); Wolff M. Kirsch, Redlands, CA (US); Samuel R. Sturgill Barnes, Grand Terrace, CA (US)

(73) Assignee: Loma Linda University Medical Center, Loma Linda, CA (US)

( * ) Notice: Subject to any disclaimer, the term of this patent is extended or adjusted under 35 U.S.C. 154(b) by 412 days.

(21) Appl. No.: 13/426,449

(22) Filed: Mar. 21, 2012

(65) Prior Publication Data

US 2012/0263362 A1    Oct. 18, 2012

Related U.S. Application Data

(63) Continuation-in-part of application No. 13/107,799, filed on May 13, 2011, now abandoned.

(60) Provisional application No. 61/334,522, filed on May 13, 2010.

(51) Int. Cl.
*G06K 9/00* (2006.01)
*G06T 7/00* (2006.01)

(52) U.S. Cl.
CPC .......... *G06T 7/0012* (2013.01); *G06K 2209/05* (2013.01); *G06T 2207/10088* (2013.01); *G06T 2207/30016* (2013.01)

(58) Field of Classification Search
None
See application file for complete search history.

(56) References Cited

U.S. PATENT DOCUMENTS

| | | | | |
|---|---|---|---|---|
| 5,352,979 A | * | 10/1994 | Conturo | 324/307 |
| 6,501,272 B1 | * | 12/2002 | Haacke et al. | 324/306 |
| 6,560,353 B1 | * | 5/2003 | Haacke et al. | 382/128 |
| 6,650,272 B2 | * | 11/2003 | Krikorian et al. | 342/25 R |
| 6,658,280 B1 | * | 12/2003 | Haacke | 600/410 |
| 7,154,269 B1 | * | 12/2006 | Haacke et al. | 324/309 |
| 8,781,197 B2 | * | 7/2014 | Wang et al. | 382/131 |
| 2011/0044524 A1 | * | 2/2011 | Wang et al. | 382/131 |

OTHER PUBLICATIONS

Li et al (Quantifying arbitrary magnetic susceptibility distributions with MR) 1077-1082 (2004).*
Li et al., "Quantifying Arbitrary Magnetic Susceptibility Distributions With MR," Magnetic Resonance in Medicine, 51:1077-1082 (2004) Wiley InterScience.
McAuley et al., Office Action dated Jan. 16, 2013 issued in parent U.S. Appl. No. 13/107,799, filed May 13, 2011.

* cited by examiner

*Primary Examiner* — Nancy Bitar
(74) *Attorney, Agent, or Firm* — Knobbe Martens Olson & Bear, LLP

(57) ABSTRACT

An automatic method for detection and quantification of localized sources of magnetic susceptibility in images using a computer with instructions for a parameter module; an image input and filtering module; a second image filtering module; and a pattern quantification module.

38 Claims, 13 Drawing Sheets

IRON QUANTIFICATION OF BRAIN MICROBLEEDS

CROSS-REFERENCE TO RELATED APPLICATIONS

The present application is a Continuation-in-Part of U.S. patent application Ser. No. 13/107,799, titled "Iron Quantification of Brain Microbleeds," filed May 13, 2011, which claims the benefit of U.S. Provisional Patent Application No. 61/334,522, titled "Iron Quantification of Microbleeds in Postmortem Brain," filed May 13, 2010, the contents of which are incorporated by reference herein in their entirety.

BACKGROUND

Brain microbleeds (BMB) are associated with ischemic and hemorrhagic stroke, cerebral amyloid angiopathy (CAA), neurotrauma, Alzheimer's disease (AD), vascular dementia, cognitive decline, hypertension and aging. The presence of BMB in ischemic stroke, intracerebral hemorrhage (ICH) and CAA is associated with future hemorrhage. Whether presence of BMB increases the risk of bleeding when thrombolytic and antithrombotic agents are used is an important and controversial question. Thus, BMB are associated with both chronic and acute illness of no small consequence in our aging population.

BMB are visible in gradient recalled echo (GRE) $T_2^*$ magnetic resonance (MR) imaging as focal regions of signal loss and have been histopathologically related to hemosiderin, the (paramagnetic) iron-protein complex associated with pathologic iron storage following hemorrhage and ferritin breakdown. Thus, BMB represent a source of pathologic iron in the brain that is potentially cytotoxic (e.g., by free radical production through the Fenton reaction). Oxidative damage, iron accumulation and/or changes in iron metabolism have been implicated in neurodegenerative and cerebrovascular diseases. In addition, since iron is deposited at the site of a BMB in proportion to the amount of extravasated blood, iron content in BMB can be considered a marker for the severity of underlying vessel disease. Therefore the quantified iron content in BMB is potentially informative regarding disease progression and the efficacy of treatment.

Past efforts to quantify brain iron have focused on content estimation within distributed brain regions. BMB, however, represent a localized source of iron deposition. Iron content and concentration of BMB have been heretofore absent in the literature. In addition, conventional "magnitude" MR images have significant limitations especially for localized iron quantification, and the well known blooming effect typically obscures the true dimensions of an iron susceptibility source. A few studies have compared radiologic BMB to postmortem human tissue and have noted evidence of associated tissue damage. However, in vivo methods would allow the investigation of temporal relationships regarding tissue damage evolution following BMB and possible interventions. In particular, methods correlating BMB iron content levels with the severity and evolution of tissue damage can shed light on the role of iron in the disease process.

Therefore, there is the need for an improved method of quantifying iron in BMB, which is capable of determining iron content and/or concentration, that is not associated with disadvantages, like the blooming effect, of conventional "magnitude" MR images.

SUMMARY

According to one embodiment of the invention, there is provided a method to quantify localized iron sources using MR phase images. This method can be used to quantify iron content and estimate true source diameter, unobscured by the blooming effect, in actual BMB.

According to one embodiment of the invention, there is provided a method to quantify iron content or effective diameter of a localized iron source in an anatomical region of a subject, comprising the steps of (a) obtaining a phase image from a magnetic resonance scan of the anatomical region of the subject; (b) identifying a dipole pattern in the phase image corresponding to a localized iron source in the anatomical region; (c) measuring one or more than one image parameter of the dipole pattern; and (d) relating the image parameter measured in step (c) to a quantity of the iron contained in the localized iron source or the effective diameter of the source.

In a preferred embodiment of the invention, the phase image is obtained from an in vivo magnetic resonance scan.

In alternative versions of the method, the phase image is a raw phase image, a high-pass filtered phase image or phase-enhanced magnitude image.

In a particularly preferred embodiment of the method, the anatomical region comprises a portion of a brain and the localized iron source corresponds to a brain microbleed.

According to one embodiment of the invention, the subject is a mammal, preferably a human.

In alternative versions of the method, the dipole pattern is in a horizontal, coronal or axial orientation.

According to one embodiment of the invention, the dipole pattern is identified using one or more than one matching template.

In one embodiment, the image parameters $r_\pi$ and $r'_\pi$ are determined from a rectangle bounding the dipole pattern, the rectangle comprising a width and a height, where $r_\pi$ is one half of the width and $r'_\pi$ is one half of the height of the bounding rectangle.

Another embodiment of the present invention further comprises converting gray-scale high pass filtered phase images to binary images before drawing bounding rectangles.

In alternative versions of the method, the image parameter is related to the mass of iron, the iron concentration or the diameter of the localized iron source.

Another embodiment of the present invention further comprises categorizing disease severity based on the quantity of iron determined in step (d).

One embodiment of the present invention provides a method that further comprises repeating steps (a), (b), (c) and (d) at a later time point to monitor any change in disease severity.

The invention is described in more detail by the following description.

BRIEF DESCRIPTION OF THE DRAWINGS

These and other features, aspects and advantages of the present invention will become better understood with regard to the following description, appended claims, and accompanying figures where:

DETAILED DESCRIPTION

Figure 1A:
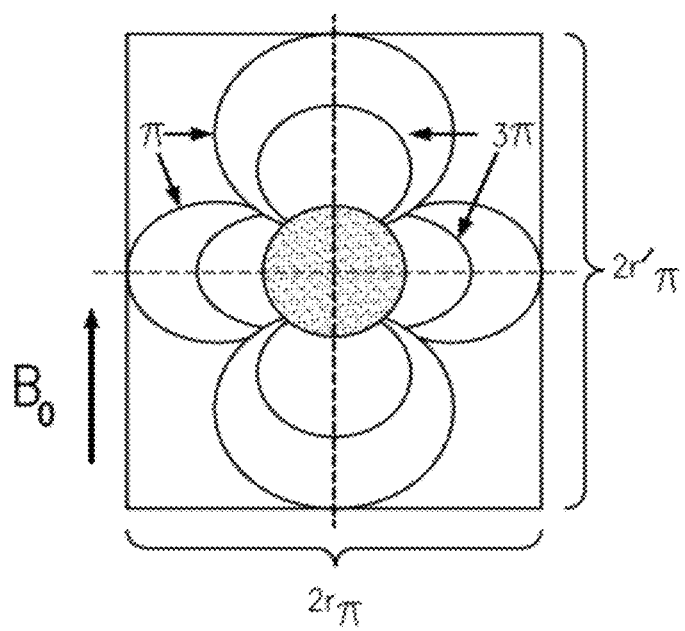
FIG. 1A shows a bounding rectangle drawn around a schematic of a spherical dipole pattern in horizontal orientation, where the main field $B_0$ is parallel to the axis of the dipole, the black lines represent the phase wraps (shown are $\pi$ and $3\pi$ wraps), and the widths and heights of the rectangle are respectively $2r_\pi$ and $2r_\pi$.

According to one embodiment of the invention, there is provided a method to quantify iron content of a localized iron source in an anatomical region of a subject. The method comprises the steps of (a) obtaining a phase image from a magnetic resonance scan of the anatomical region of the subject; (b) identifying a dipole pattern in the phase image corresponding to a localized iron source in the anatomical region; (c) measuring one or more than one image parameter of the dipole pattern; and (d) relating the image parameter measured in step (c) to a quantity of the iron contained in the localized iron source.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel, distributed or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention.

The term "portable electronic device" refers to any current or future electronic device such as a smartphone, a table, an eBook reader or the like that displays information to one or more than one user.

Various embodiments provide a device and a method for a remote control for portable electronic devices that is simple operate and operable with a single hand. One embodiment of the present invention provides a system comprising one or more portable electronic device and one or more remote control for portable electronic devices. In another embodiment, there is provided a method for using the system. The system and method will now be disclosed in detail.

LIST OF SYMBOLS

| | |
|---|---|
| $r'_\pi$ | point where the phase reaches the value of $\pi$ along vertical dipole axis |
| U | Collagenase enzyme activity units |
| $\Delta_\chi$ | change in magnetic susceptibility |
| $\rho$ | density |
| m | mass |
| $m_{Fe}$ | mass of iron |
| $f_{(Fe)}$ | w/w iron concentration |
| POD | Postoperative day |

Theoretical Background and Rationale

MR voxels containing and surrounding paramagnetic (or ferromagnetic) brain iron deposits have an altered local field $\Delta B$, and thus an altered magnetization phase with respect to their neighbors. This phase difference is detectible in GRE pulse sequences and described by the formula (for a right handed system):

$$\Delta\phi = -\gamma \Delta B T_E \quad [1]$$

where $\Delta\phi$ is the change in phase, $\gamma$ is the proton gyromagnetic ratio, and TE is the echo time. Thus, the amount of iron in a voxel can potentially be related to the phase.

An easily identified parameter in modulo $2\pi$ phase-wrapped images can be mathematically related to iron mass in a localized spherical sample (Eq. 2). Briefly, FIG. 1A shows a schematic cross section of an iron sample dipole phase pattern induced by the main MRI magnetic field ($B_0$), and FIG. 1C shows a corresponding phase profile taken across the horizontal dotted line in FIG. 1A. The value on the abscissa corresponding to $\Delta\phi_D = \pi$ is denoted by $r_\pi$ and $r_\pi$ is easily measured from the wrapped profile (FIG. 1D) or the rectangle bounding the $\pi$-phase wrap of the dipole pattern (FIG. 1A). Under the assumptions that i) the magnetic susceptibility is constant both internal ($\chi_i$) and external ($\chi_e$) to the iron sample, ii) $\Delta\chi$, the susceptibility difference, defined as $\Delta\chi = (\chi_i - \chi_e)$, is very small ($\sim 10^{-5}$), iii) the density of the samples $\rho$ is constant, and iv) all background phase has been removed, $r_\pi$ is related to iron mass of the sample by Eq. 2:

$$m_{Fe} = \left(\frac{4\pi^2 \rho}{\gamma \Delta \chi B_0 T_E}\right) r_\pi^3 \quad [2]$$

The true radius a of the iron source (unobscured by the blooming effect) can also be related to $r_\pi$ by Eq. 3, and for a given $\Delta\chi$, $r_\pi$ can in principle be converted among magnet field strength and echo time by Eq. 4:

$$a = \left(\frac{3\pi}{V\Delta XB_oT_E}\right)^{1/3} r_\pi \qquad [3]$$

$$\frac{r_{\pi_2}}{r_{\pi_1}} = \left(\frac{B_{0_2}T_{E_2}}{B_{0_1}T_{E_1}}\right)^{1/3} \qquad [4]$$

In this present study, we denote by $r'_\pi$ the value on the ordinate dipole axis corresponding to $\Delta\phi_D = \pi$. Thus, $r'_\pi$ is analogously related to the vertical n-wrap and phase profile (taken along vertical dotted line in FIG. 1A) as $r_\pi$ is to the horizontal. It follows that the profile intensities are proportional to each other (proportionality constant of −2), and that $r_\pi$ and $r'_\pi$ are related by Eq. 5 below. Thus, $r'_\pi$ analogs of Eqs. 2-4 can be expressed as Eqs. 6-8:

$$r'_\pi = 2^{1/3} r_\pi$$

$$m_{Fe} = \left(\frac{2\pi^2 \rho}{V\Delta XB_oT_E}\right) r'^3_\pi \qquad [6]$$

$$a = \left(\frac{3\pi}{2V\Delta XB_oT_E}\right)^{1/3} r'_\pi \qquad [7]$$

$$\frac{r'_{\pi_2}}{r'_{\pi_1}} = \left(\frac{B_{0_2}T_{E_2}}{B_{0_1}T_{E_1}}\right)^{1/3} \qquad [8]$$

Both $r_\pi$ and $r'_\pi$ can simultaneously be measured from the dimensions of the rectangle bounding the dipole phase pattern as shown in FIG. 1A. Because $r'_\pi$ is larger than $r_\pi$ (Eq. 5) it has the advantage of a larger dynamic range compared with $r_\pi$.

Figure 1B:
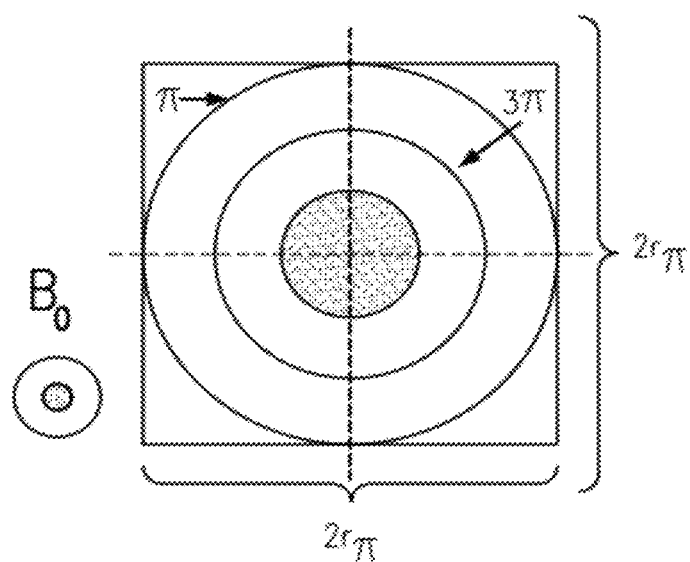
FIG. 1B shows a bounding rectangle drawn around the dipole in axial orientation showing $\pi$ and $3\pi$ phase wraps, where the plane shown is a cross section of the equatorial plane of FIG. 1A, thus the dimensions are equal to $2r_\pi$ and the main field is shown projecting out of the plane of the page.
Figure 1C:
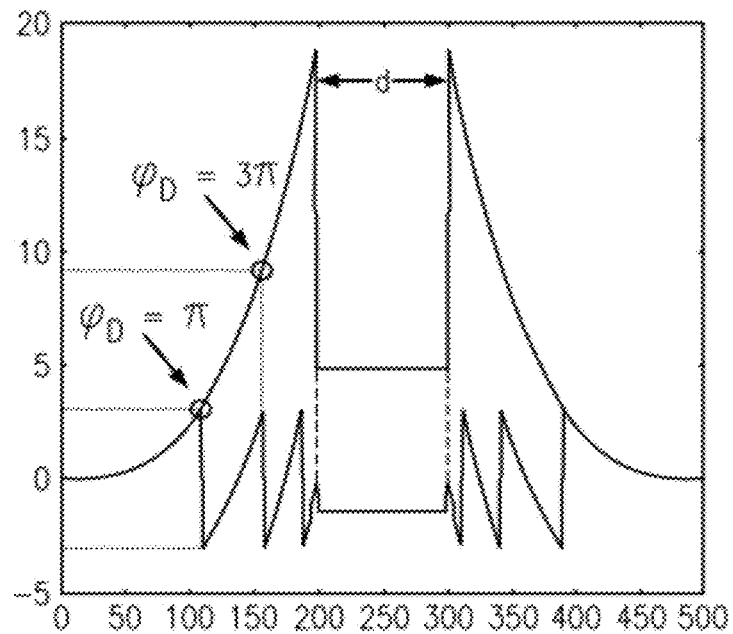
FIG. 1C shows phase profiles drawn along the dipole equator (dotted lines in FIGS. 1A and 1B)
Figure 1D:
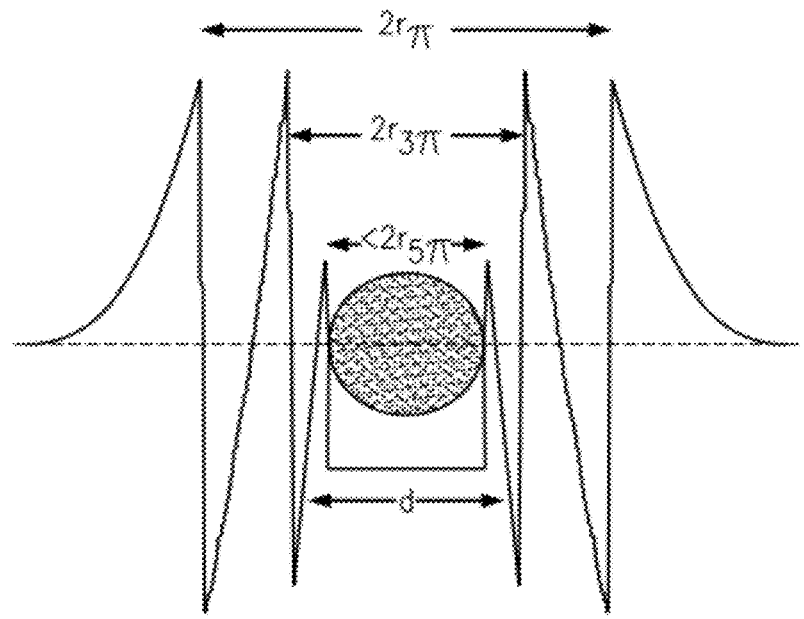
FIG. 1D is a magnified view of the wrapped profile in FIG. 1C superimposed with a circle representing a spherical iron source.

FIG. 1B shows an axial cross section of the phase-wrapped dipole pattern corresponding to the equatorial plane of FIG. 1A. The prominent curved lines in FIGS. 1A and 1B correspond to phase wraps ($\pi$ and $3\pi$ wraps are shown) which appear as concentric circles in the axial orientation for a spherical source. Thus, $r_\pi$ can alternately be determined from axial bounding rectangles (FIG. 1B), and the horizontal profile (along the horizontal dashed line of FIG. 1A and shown in FIGS. 1C and 1D) is equivalent to an axial profile along any diameter (e.g., along the horizontal dashed line of FIG. 1B). Careful examination of the profiles reveal that ideally, phase wraps can be used to determine the diameter of a susceptibility source (FIGS. 1C and 1D). In addition, while Eqs. 3 and 7 require a knowledge of $\Delta_\chi$ to relate source diameter to $r_\pi$ and $r'_\pi$ in principle diameter can be determined by phase wrap geometry alone. In practice, signal loss in noisy dipole centers will obscure higher order phase wraps. Nevertheless, the sequence of phase diameters $2r_\pi$, $2r_{3\pi}$, $2r_{5\pi}$, etc. that are discernable provide increasingly better approximations of the true diameter, and allows classification of sources based on diameter thresholds unobscured by blooming. It follows from equation 4 that $r_{n\pi} = n^{(-1/3)} r_\pi$. This implies that higher order phase diameters need not be measured directly. If a higher order phase wrap is present, the corresponding phase diameter can be calculated based on the most robust wrapping diameters, $r_\pi$ or $r'_\pi$.

Eqs. 2 and 6 predict proportional relationships between the $r_\pi$ and $r'_\pi$ parameters and sample iron mass. Therefore, plots of these experimentally measured variables were used to verify the predictions and validate the method. Assuming similar values of iron sample density and susceptibility, such plots can then be used as standard curves to predict iron content in similar samples. In addition, we use phase diameters to estimate BMB source diameter and iron concentration.

FIGS. 1A-1D are schematics and drawings of an Image Parameter Measurement that shows phase image parameters can be measured using bounding rectangles or phase profiles. FIG. 1A shows a bounding rectangle drawn around schematic of a spherical dipole pattern in horizontal orientation. The widths and heights of the rectangle (solid lines) are respectively $2r_\pi$ and $2r'_\pi$. The curved lines represent the phase wraps (shown are $\pi$ and $3\pi$ wraps). The main field $B_0$ is parallel to the axis of the dipole. FIG. 1B shows a bounding rectangle drawn around the dipole in axial orientation showing $\pi$ and $3\pi$ phase wraps. The plane shown is a cross section of the equatorial plane of FIG. 1A, thus the dimensions are equal to $2r_\pi$. The main field is shown projecting out of the plane of the page. FIG. 1C shows phase profiles drawn along the dipole equator (dotted lines in FIGS. 1A and 1B) appear modulo $2\pi$ (lower trace). These wrapped profiles can be used to measure $r_\pi$, or can in principle be unwrapped (upper trace) and used to estimate, d, the diameter of the iron source or an arbitrary phase value (e.g., $3\pi$). The unwrapped profile intersects the wrapped profile where the phase $\Delta\phi_D$ is equal to $\pi$. The parameter $r_\pi$ can be related to the phase profile taken along the vertical black dotted line in FIG. 1A. FIG. 1D is a magnified view of the wrapped profile in FIG. 1C superimposed with a circle representing a spherical iron source. Peak to peak widths of phase wrappings are proportional to $r_\pi$ and $r_{3\pi}$. Note that the distance between the most medial peaks is equal the diameter of the source (d). However, since these peaks do not represent a full phase wrapping $d < 2r_{5\pi}$, and $r_{3\pi} < d < r_{5\pi}$.

To test magnetic resonance phase image methods to quantify iron content and source diameter of brain microbleeds (BMB) in postmortem human tissue. Tissue slices containing BMB were imaged using a susceptibility weighted imaging protocol at 11.7 T. Image features and parameters in high-pass filtered phase images were related to lesion iron content and source diameter by using a mathematical model. BMB lesions were dissected from tissue slices and assayed for iron using atomic absorption spectrometry. BMB iron content was plotted against phase image parameters to compare experimental data with underlying theory. Image features and model equations were used to estimate BMB diameter and iron concentration. A strong linear relationship predicted by theory was observed in the experimental data, validating our methods, and presenting a tentative standardization curve where BMB iron in similar tissues could be related to image parameters.

Postmortem Human BMB Sample Preparation

Post mortem human brain tissue was donated from the Alzheimer's Disease Research Center Brain Bank at the University of California, Los Angeles. The research protocol was approved by the Institutional Review Board of Loma Linda University Medical Center. On average five 1 cm coronal slices representing frontal, temporal/parietal and occipital lobar areas were obtained from three cases histopathologically diagnosed as comorbid for advanced AD (Braak and Braak V-VI) and CAA (Vonsattel stage 3). The tissue slabs were embedded in 2% agarose and imaged on a Siemens' 3 T MRI clinical scanner using a standard SWI protocol (referred to in text as preparation images). After imaging, the tissue was separated from the agarose and magnitude and phase preparation images were used to identify and dissect microbleeds. Approximately 40 blocks of tissue were collected, each containing at least one BMB. Care was taken to represent each autopsy case and each brain region. To alleviate air-tissue interface susceptibility artifacts encountered in ex vivo imaging of brain tissue, tissue blocks were again embedded in 2% degassed agarose in plastic scintillation tubes. Care was taken to eliminate small air bubbles which produce artifacts that can mimic the presence of BMB iron.

Figures 2A, 2B, 2C, 2D:
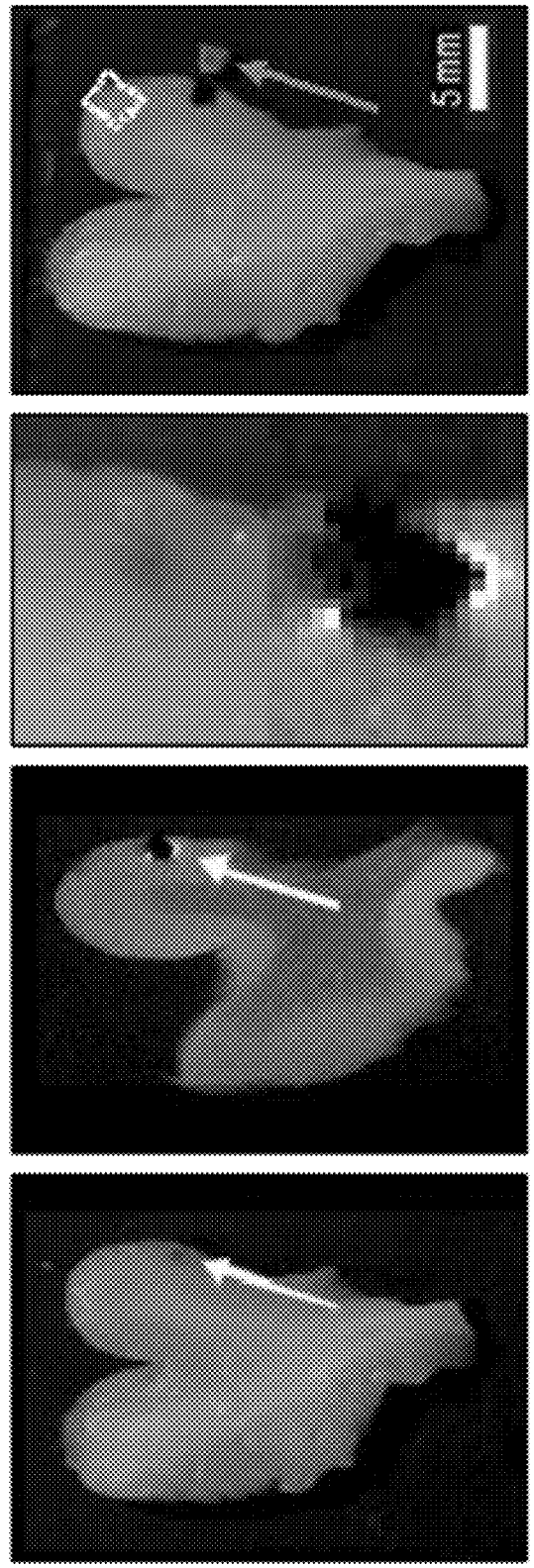
FIG. 2A is an MR image showing tissue slices of postmortem brain embedded in agarose and scanned at high field MRI, where an arrow points to a cortical brain microbleed (BMB)
FIG. 2B shows a T1 weighted image of the tissue slices of postmortem brain shown in FIG. 2A that reveals the presence of the BMB.
FIG. 2C is a close-up view of the tissue BMB shown in FIG. 2A (top of panel) and the corresponding MR image shown in FIG. 2B (bottom of panel)
FIG. 2D is an MR image showing small pieces of tissue containing BMB (arrow) or free of BMB (cut from dotted region) that were dissected and assayed for iron content using atomic absorption spectroscopy.

FIGS. 2A-2D are MR images of BMB in Postmortem Brain. FIG. 2A is an MR image showing tissue slices were embedded in agarose and scanned at high field MRI. Arrows point to a cortical BMB and FIG. 2B shows a T1 weighted image that reveals the presence of the BMB (11.7 T, TR/TE: 630.8/17.9, NEX: 4, FOV: 22 mm, MAT: 256×256, Thk: 0.3 mm). FIG. 2C is a close-up view of the tissue BMB (top of panel) and the corresponding MR image correlate (bottom of panel). FIG. 2D is an MR image showing small pieces of tissue containing BMB (arrow) or free of BMB (cut from dotted region) that were dissected and assayed for iron content using atomic absorption spectroscopy.

Magnetic Resonance Imaging

Susceptibility weighted imaging (SWI) is a GRE sequence that uses magnetic susceptibility-dependent complex phase information to provide or enhance image contrast and is very sensitive in BMB detection. Besides the preparation image sequence used in sample preparation (see above), we used two SWI sequences for this study (referred to in text as data images): a 3D SWI horizontal sequence, and a 2D axial sequence. The 2D sequence was used because comparative 3D axial scans had significant background phase apparently due to inadequate magnetic shimming.

Sample tubes were scanned in an 11.7 T small vertical-bore MR scanner (Bruker Biospin, Billerica Mass.) using the following parameters: 1): 3D horizontal sequence: TR/TE: 100/7 ms, flip angle: 20°, matrix: 256×256, NEX: 1, FOV: 2.2 cm, in-plane resolution: 0.0859 mm×0.0859 mm, and 32 slices of thickness 0.688 mm. 2) a 2D SWI axial sequence: TR/TE: 154.4-617/7 ms, flip angle: 20°, matrix: 256×256, NEX: 4, FOV: 2.2 cm, in-plane resolution: 0.0859 mm×0.0859 mm, slices: 20-40 of thickness 0.688 mm.

Image and Data Processing

Raw horizontal and axial phase images were respectively high-pass filtered with 16×32 and 32×32 frequency domain filters, respectively using SPIN software (MRI Institute, Detroit, Mich.). Magnitude images were multiplied four times by a phase mask created from the high-pass filtered (HP) images to produce phase-enhanced magnitude images. The image parameters $r_\pi$ and $r'_\pi$ were obtained from the horizontal HP images using the height and width of the rectangle bounding the dipole phase patterns of each sample. In addition, the ratio of the sides of rectangles bounding dipole patterns in the axial images were used to help assess the spherical symmetry of the samples. Bounding rectangles are shown in the schematics of FIGS. 1A and 1B, and for real data samples in FIGS. 3I and 3J. Using the ImageJ software package (ImageJ, NIH), the rectangle was drawn, its height and width were determined, and $r_\pi(r'_\pi)$ is calculated as ½ of width (height) of the rectangle.

Iron Content Determination

Tissue slices were removed from agarose and BMB were located in the slices with the aid of SWI data images. Small blocks of tissue surrounding the BMB were dissected from the slices using a diamond knife (FIG. 2). To increase the fraction of BMB iron versus background iron, the surrounding tissue in each block was trimmed away as deemed necessary or practical. Control blocks were also dissected and care was taken so that control blocks were cut out of similar tissue (e.g., cortical grey matter) as BMB blocks. All sample blocks were weighed with a precision mass balance. Samples were wet ashed: blocks (2-21 mg) were dissolved in 250 µl of 70% $HNO_3$ for 12 to 48 hours, heated at 80° C. for 20 min, and allowed to cool to room temperature. 250µl of 10M of $H_2O_2$ were added, and after 30 min, samples were heated at 70° C. for 15 minutes and allowed to cool. Iron concentrations were measured in triplicate by graphite furnace atomic absorption spectrometry (SpectrAA 220Z, Varian, Victoria, Australia).

BMB Diameter and Iron Concentration Calculation

Figures 3A, 3B, 3C, 3D:
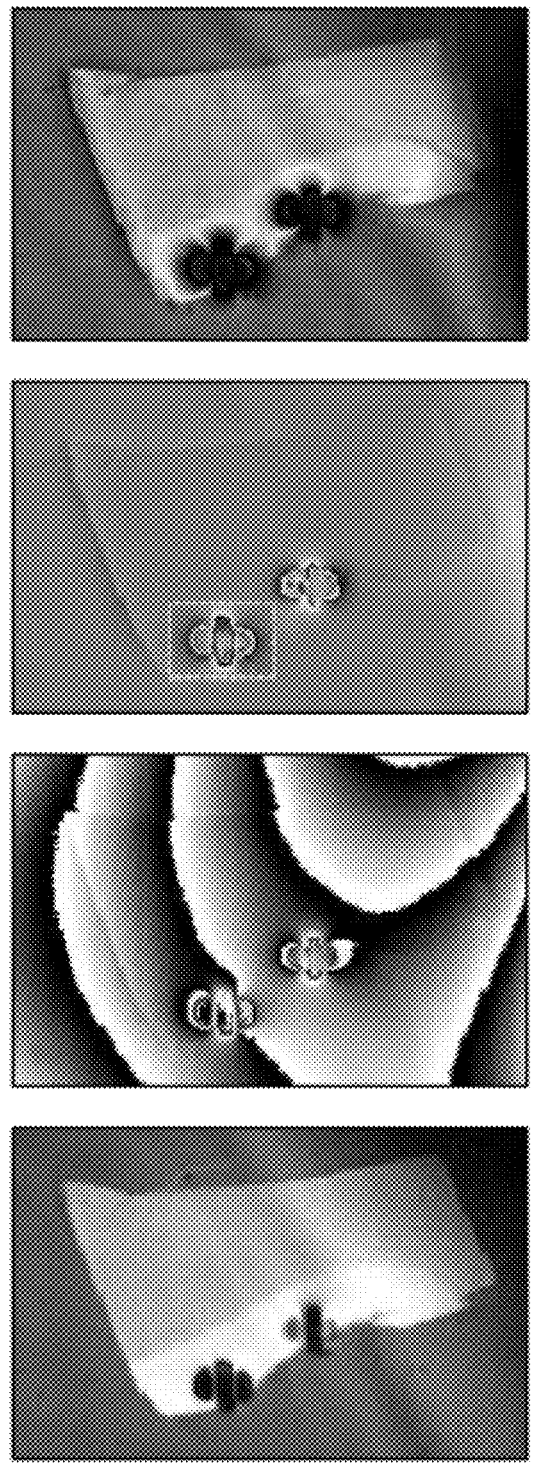
FIG. 3A shows magnitude images of two cortical grey BMB in postmortem CAA brain in horizontal orientations, exhibiting characteristic dipole patterns.
FIG. 3B shows raw phase images of two cortical grey BMB in postmortem CAA brain in horizontal orientations, exhibiting characteristic dipole patterns.
FIG. 3C shows high-pass filtered phase images of two cortical grey BMB in postmortem CAA brain in horizontal orientations, exhibiting characteristic dipole patterns, where the top lesion (dotted rectangle) is shown in the axial images (FIGS. 3E-3H)
FIG. 3D shows phase-enhanced magnitude images of two cortical grey BMB in postmortem CAA brain in horizontal orientations, exhibiting characteristic dipole patterns.
Figure 3E:
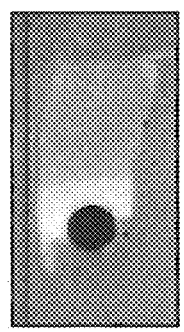
FIG. 3E shows a magnitude image of a cortical grey BMB (the top lesion in FIG. 3C) in postmortem CAA brain in axial orientation.
Figure 3F:
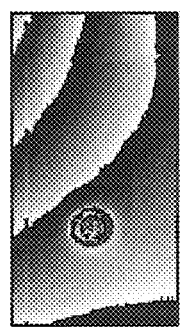
FIG. 3F shows a raw phase image of a cortical grey BMB (the top lesion in FIG. 3C) in postmortem CAA brain in axial orientation.
Figure 3G:
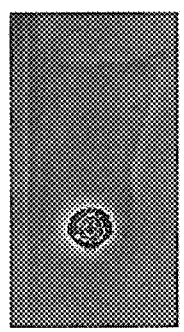
FIG. 3G shows a high-pass filtered phase of SWI image of a cortical grey BMB (the top lesion in FIG. 3C) in postmortem CAA brain in axial orientation.
Figure 3H:
FIG. 3H shows a phase-enhanced magnitude SWI image of a cortical grey BMB (the top lesion in FIG. 3C) in postmortem CAA brain in axial orientation.
Figure 3I:
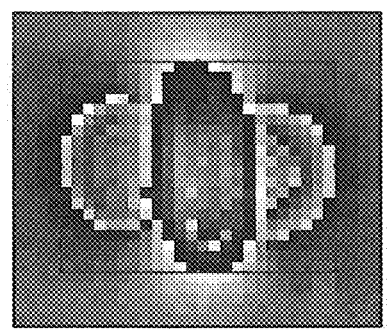
FIG. 3I shows a bounding rectangle surrounding a magnification (12×) of the top lesion in the panel of FIG. 3C (dotted rectangle) in horizontal orientation.
Figure 3J:
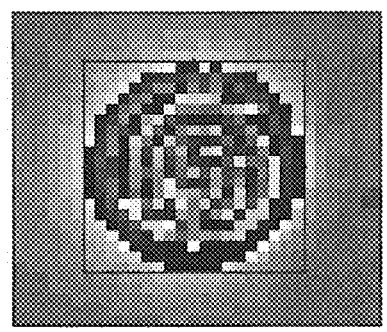
FIG. 3J shows a bounding rectangle surrounding a magnification (12×) of the top lesion in the panel of FIG. 3C (dotted rectangle) in axial orientation (FIG. 3J is a magnification of the panel shown in FIG. 3G)
Figure 3K:
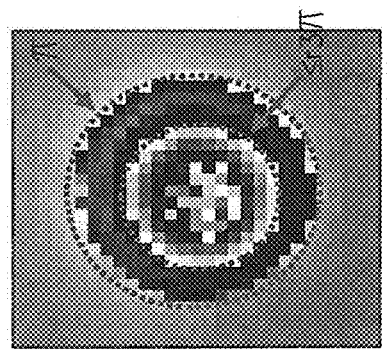
FIG. 3K is a magnification of the lower (unmarked) lesion in the panel shown in FIG. 3C showing the π phase wrap and an interior hyperintense ring of radius≤$r_{3\pi}$ (respectively, highlighted by dotted lines)

Bounding rectangles were drawn around the innermost hyperintense ring in axial dipole patterns from 13 samples (FIG. 3K). The innermost ring corresponded to the $r_{3\pi}$ or $r_{5\pi}$ phase wrap in the samples. In cases of uncertainty (5/13) the lower wrap was used (i.e., $r_{3\pi}$ instead of $r_{5\pi}$). The average of the dimensions of the rectangle was taken as the diameter of the lesion. Though the average ratio of the rectangle dimensions was 0.96±0.03 (mean±standard error), the dimensions typically differed by a few pixels (0 pixels—4 samples; 1 pixel—5 samples; 2 pixels—3 samples; 3 pixels—1 sample), and rectangles were easier to objectively place around the rings than circles. The phase diameters $2r_{3\pi}$, $2r_{5\pi}$, and $2r_{7\pi}$ were calculated using the corresponding $r_\pi$ for each sample according to the formulas: $r_{n\pi} = n^{-1/3} r_\pi$ for n=3, 5, and 7. Sample iron mass (as determined above) was divided by $(\pi/6) d^3$ to obtain iron concentrations. Units of $\mu g/cm^3$ were converted to $\mu g/g$ wet tissue weight assuming a tissue density equal to water.

Sample Inclusion/Exclusion

Over 40 putative BMB were originally identified in 40 MR scans. For practical reasons, a subset of 26 of the most promising putative BMB were chosen and afterward underwent image and tissue processing. Selection was based primarily on the quality of the dipole appearance (e.g., symmetry, distinct edges) seen in magnitude SWI scans. Seven samples were excluded after image and tissue processing: one sample was damaged during dissection, two samples displayed inadequate background phase removal, one sample dipole was due to an air bubble, one sample dipole was highly distorted, and two samples displayed faint and indistinct dipoles. A total of 19 samples were included in the iron content analysis. Six additional samples were excluded from iron concentration analysis and 13 samples were used.

Statistical Analysis

The predicted proportional relationships between BMB iron mass and the image parameters $r_\pi$ and $r'_\pi$ was tested by linear regression analysis using SigmaPlot version 11 (Systat Software, Inc., Chicago, Ill.). Plots of these variables were constructed along with a best-fit least squares regression lines. Normality of BMB iron concentration was tested using a Shapiro-Wilk test. Statistical significance was considered at $p<0.05$.

Results

Magnitude, raw phase, high-pass filtered phase and phase-enhanced magnitude horizontal and axial images of two BMB samples are shown in FIG. 3. Robust characteristic dipole patterns are seen in each image. High-pass filtered images generally exhibited dipole patterns with clearly visible phase wraps surrounded by a largely homogenous background and phase profiles with sharp peaks (FIGS. 3I-3K). The average $r'_\pi$ to $r_\pi$ was 1.24±0.13 consistent with the theoretical value of $2^{1/3}$=1.26. This implies that the filtering did not significantly distort the aspect ratio of the dipole pattern.

Figure 3L:
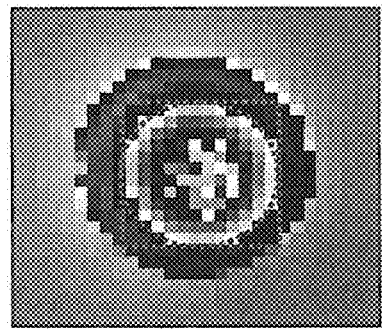
FIG. 3L is the same image as FIG. 3K showing a dotted rectangle used to estimate the diameter of the inner ring (dotted lines)

FIGS. 3A-3L are SWI of BMB in Postmortem CAA Brain, namely, magnitude (FIGS. 3A and 3E), raw phase (FIGS. 3B and 3F), high-pass filtered phase (FIGS. 3C and 3G) and phase-enhanced magnitude (FIGS. 3D and 3H) images of two cortical grey BMB, showing horizontal (FIGS. 3A-3D) and axial (FIGS. 3E-3H) orientations respectively. The top lesion (dotted rectangle) in the panel of FIG. 3C is shown in the axial images (FIGS. 3E-3H). Characteristic dipole patterns were seen in each image. In FIGS. 3I and 3J bounding rectangles are shown surrounding magnifications (12×) of the top lesion in the panel of FIG. 3C (dotted rectangle) in horizontal (FIG. 3I) and axial (FIG. 3J) orientations (FIG. 3J is a magnification of the panel shown in FIG. 3G). FIG. 3K is a magnification of the lower (unmarked) lesion in the panel shown in FIG. 3C showing the π phase wrap and an interior hyperintense ring of radius≤$r_{3\pi}$ (respectively highlighted by red dotted lines). FIG. 3L is the same image as FIG. 3K showing a bounding rectangle used to estimate the diameter of the inner ring (dotted lines). The lesion diameter is estimated by this diameter, and bounded by the phase diameters $2r_\pi$ and $2r_{3\pi}$, (see text).

Measured iron mass, $r'_\pi$, $r_\pi$, as well as estimated diameter and iron concentration is shown for BMB samples in Table 1.

TABLE 1

Data from postmortem BMB.

| Sample | $m_{Fe}$ (μg) | $r'_\pi$ (mm) | $r_\pi$ (mm) | d (mm) | [Fe] (μg/g) |
|---|---|---|---|---|---|
| 1 | 0.73 ± 0.05 | 0.86 ± 0.14 | 0.65 ± 0.09 | — | — |
| 2 | 0.98 ± 0.02 | 0.99 ± 0.13 | 0.77 ± 0.09 | 1.031 | 1705 |
| 3 | 1.54 ± 0.03 | 1.03 ± 0.13 | 0.86 ± 0.09 | 1.203 | 1687 |
| 4 | 0.90 ± 0.02 | 0.86 ± 0.14 | 0.73 ± 0.09 | 0.988 | 1786 |
| 5 | 0.86 ± 0.04 | 0.95 ± 0.13 | 0.65 ± 0.09 | 0.859 | 2580 |
| 6 | 1.04 ± 0.03 | 1.20 ± 0.12 | 0.86 ± 0.09 | 1.160 | 1269 |
| 7 | 2.01 ± 0.09 | 1.29 ± 0.12 | 0.99 ± 0.09 | 1.031 | 3502 |
| 8 | 1.14 ± 0.07 | 1.07 ± 0.13 | 0.73 ± 0.09 | — | — |
| 9 | 0.43 ± 0.06 | 0.86 ± 0.14 | 0.60 ± 0.09 | 0.816 | 1499 |
| 10 | 0.55 ± 0.03 | 0.77 ± 0.14 | 0.60 ± 0.09 | 0.859 | 1656 |
| 11 | 0.75 ± 0.03 | 1.03 ± 0.13 | 0.90 ± 0.09 | 0.988 | 1473 |
| 12 | 8.15 ± 0.16 | 1.81 ± 0.12 | 1.50 ± 0.09 | — | — |
| 13 | 0.49 ± 0.03 | 0.86 ± 0.14 | 0.77 ± 0.09 | 1.160 | 595 |
| 14 | 13.1 ± 0.3 | 2.19 ± 0.11 | 2.02 ± 0.09 | — | — |
| 15 | 0.065 ± 0.007 | 0.52 ± 0.18 | 0.43 ± 0.27 | — | — |
| 16 | 1.02 ± 0.04 | 0.90 ± 0.14 | 0.86 ± 0.09 | 1.117 | 1400 |
| 17 | 2.50 ± 0.05 | 1.33 ± 0.12 | 1.12 ± 0.09 | 1.246 | 2464 |
| 18 | 3.79 ± 0.14 | 1.50 ± 0.12 | 1.42 ± 0.09 | 1.461 | 2322 |
| 19 | 1.39 ± 0.10 | 1.16 ± 0.13 | 0.90 ± 0.09 | — | — |

Iron mass is measured by atomic absorption spectrometry.
$r'_\pi$ and $r_\pi$ are measured by bounding rectangles in horizontal filtered phase images.
Diameter and concentration estimates are determined as described in the text.

Figure 4:
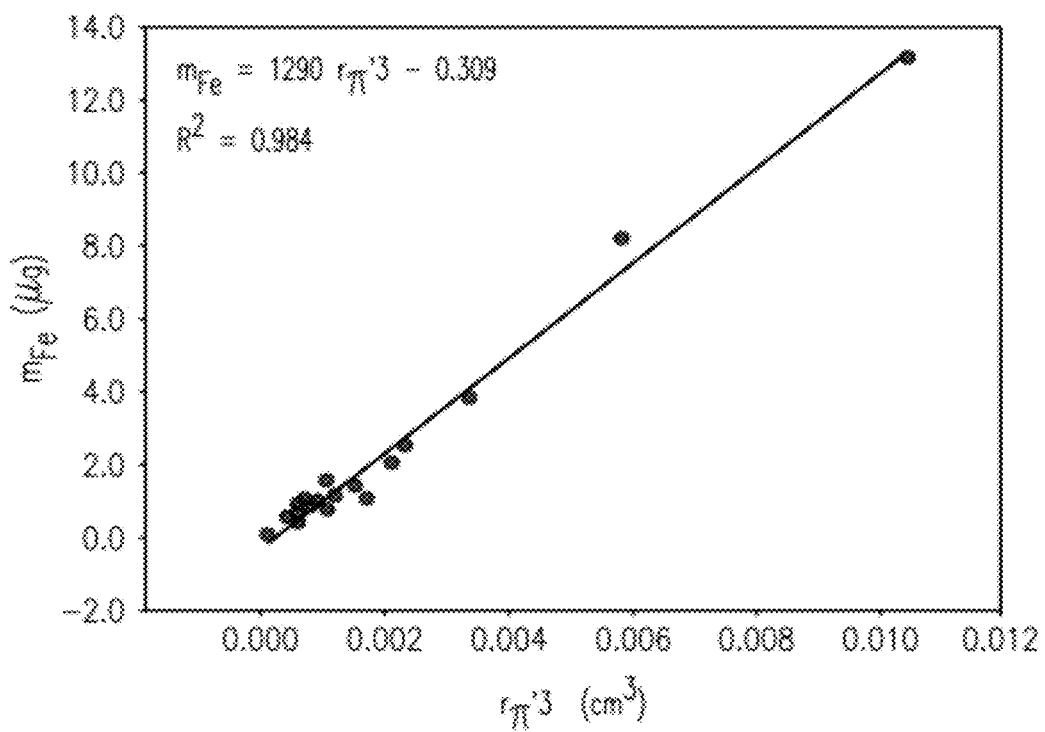
FIG. 4 is a graph showing BMB Iron Content vs. Image Parameters.

BMB iron mass vs. $r'_\pi{}^3$ is plotted in FIG. 4, and exhibits a strong linear relationship ($R^2$=0.984, p<0.001) between variables with a slope of 1260 μg/cm³ (p<0.001). The y-intercept of the plot is small but statistically significant (−0.309 μg, p=0.021). This value is smaller than all the iron masses of the samples except one (Sample 15 in Table 1), and can be interpreted as an indicator of the sensitivity of the technique. The strong linear relationship is predicted by Eq. 6 and thus confirms the usefulness of our quantification method to measure iron content in BMB from human tissues. BMB iron content ranged from 0.065 to 13.1 μg (median 1.0).

Figure 5:
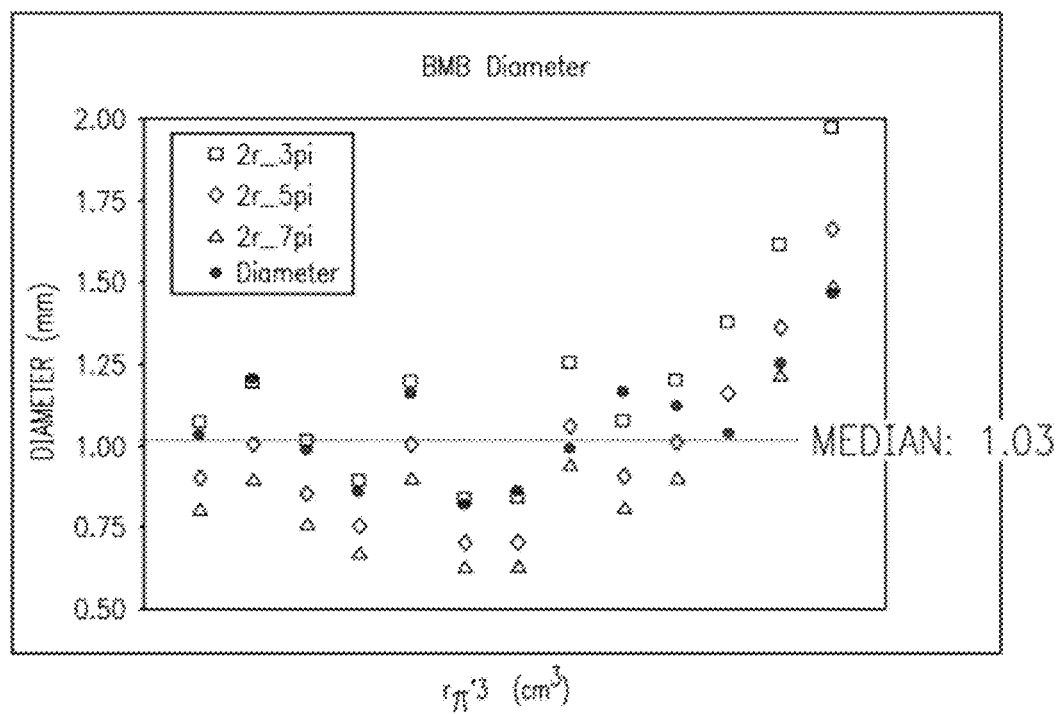
FIG. 5 is a graph showing estimated BMB lesion diameters.

FIG. 5 is a graph showing Estimated BMB Lesion Diameter Values. Estimated BMB lesion diameters are shown bounded by phase diameter estimates ($2r_\pi$, $2r_{3\pi}$, $2r_{5\pi}$) for 13 samples. The lesion diameter estimates are based on diameter estimates of inner hyperintense rings in axial dipole phase patterns (FIGS. 3K and 3L). Phase diameters are calculated from corresponding $r_\pi$ values. BMB estimated diameters ranged from 0.82 to 1.5 mm (median 1.0 mm). Diameter values ranged from 0.82 to 1.5 mm (median 1.0 mm).

Figure 6:
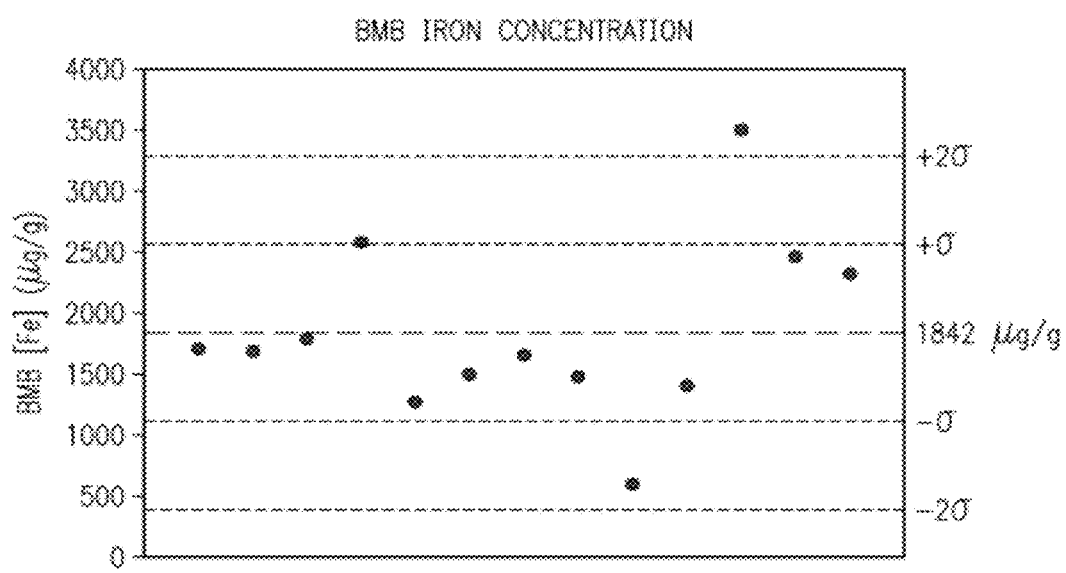
FIG. 6 is a scatter plot showing estimated BMB iron concentrations for 13 samples.

FIG. 6 is a scatter plot showing estimated BMB iron concentrations. The iron concentration values were normally distributed with a mean value of 1842 μg/g tissue. Ten of 13, and 12 of 13 samples fell within ±1, or +2 standard deviations about the mean, respectively.

Discussion

The present study demonstrates that parameters from phase images can be related to iron content in real BMB in postmortem tissue. As discussed below, FIG. 4 serves as at least a potential standard curve for human BMB where $r'_\pi$ values of filtered phase images can be related to BMB iron mass. The strong linear correlation is predicted by Eq. 6 and validates the quantification method, where the spherical dipole model gives satisfactory results for our BMB samples. Iron sample mass resolution from our tissue samples was estimated to be 0.3 μg based on the statistically significant intercept (FIG. 4). In addition, we report estimates of BMB iron mass and concentration based on direct tissue iron measurements and phase image parameters. We used atomic absorption spectrometry (considered a gold standard for tissue metal concentration measurements) to determine lesion iron content that ranged from 0.065 to 13.1 μg with a median value of 1.0 μg. Lesion diameters were estimated using features of axial dipole phase patterns. The lesion iron concentration was found to be normally distributed with a mean value of 1842±202 μg/g (mean±standard error). Seventy-seven percent and 92% of the BMB sample iron concentrations fell within ±one and two standard deviations of the mean respectively. A normal distribution allows for a simple assessment of disparity between e.g., BMB concentrations in different brain regions or diseases.

BMB are associated with a growing number of disease states and present a source of potentially cytotoxic iron to the brain in proportion to the extent of blood extravasation. Therefore the quantified iron content of BMB is a potential valuable biomarker to monitor disease progression, treatment efficacy and risk factor assessments. In recent reports: the presence of a single lobar bleed, or more than one lobar bleed fulfill in part the Boston criteria for the diagnosis of possible and probable CAA respectively; two or more baseline BMB is associated with progression from MCI to outright dementia; BMB≥5 was associated with higher risk of ICH than benefit of anti-thrombotic agents. Such studies are examples where results and clinical implications are based on BMB number. However, measurement of iron content as a continuous variable goes beyond an assessment of pathologic severity based on presence/absence or a discrete number of bleeds. Our method of localized BMB (iron) quantification allows the characterization of severity at the level of a single bleed, groups of bleeds, brain region or whole brain. For example, indices of iron load or disease burden could be defined as e.g. "the sum of the iron content for all lobar BMB". Such characterizations could provide advantages over diagnostic criteria, prognostic standards or therapeutic recommendations based on discrete numeric thresholds.

In efforts to improve interrater agreement in BMB detection and capture standardized auxiliary information several investigators have developed systematic BMB rating scales for reliable measures of presence, number, anatomical location, certain/uncertain status, and/or size. Results of the present study suggest that quantified iron content could enhance the usefulness of such discrete data We found a wide range of iron content (0.065-13.1 µg) for BMB with estimated diameters ranging from 0.82 to 1.5 mm. In addition, BMB with a diameter of 3.2 mm (unbloomed) and iron concentration of 2000 µg/g would contain ~35 µg of iron. Therefore, since our mean concentration of 1842 µg/g is probably a lower bound value, in BMB that typically meet rating scale inclusion criteria, iron content may range over two orders of magnitude. This suggests that mere counts may not necessarily be i) a good indicator of bleeding severity (e.g., 5 BMB of 1 µg each versus 1 BMB with 15 µg), or ii) a sensitive means for patient and study group comparisons (e.g., "number of BMB in the parietal cortex" versus "total iron load of parietal cortex") compared to iron content per se.

It is well known that BMB hypointensity size seen in magnitude GRE T2* images are typically larger than the actual tissue lesion. This so called blooming effect varies with field strength, scan parameters and magnetic susceptibility of the source. Results from the present study demonstrate that BMB diameter estimation unobscured by the blooming effect is possible in phase images. The Eqs. 4 and 8 further reveal that these determinations can in principle be effectively compared across various field strengths and echo times. With this new found ability, the benefits of size criteria should be revisited. Indeed, for definitions of iron load indices to be usefully compared between studies or clinical situations, BMB minimum and maximum size limits are necessary. Source dimension quantification in principle allows an objective definition of such inclusion limits.

Automated BMB detection can further improve interrater agreement, as well as increase clinical practicality. Results from the present studies underscore that the scale of such dipole templates can be related to iron content. Therefore, using appropriately scaled dipole templates (e.g., varying $r'_\pi$ and $r_\pi$ parameters) BMB can be, not only counted but simultaneously their iron content can be quantified. Moreover, BMB can also be classified by size using $r_\pi$ based diameter estimates or definitions. As described above, estimates can be made from diameters of circles or rectangles best fit to inner phase wrap rings in axial filtered phase images (FIGS. 3K and 3L). The corresponding phase diameters (as defined above) calculated from corresponding $r_\pi$ values could provide upper and lower bound values to the diameter estimates. Alternately, diameter could be defined based purely on $r_\pi$ values and used for classification. For example, lesion diameter can be defined as $r_{5\pi}$ based on pertinent knowledge of source propertied. Finally, iron or disease load indices could then be calculated from count, location and severity (i.e., iron content) data, and clinically or biologically relevant threshold criteria could flag for further investigation, provide diagnostic information or therapeutic recommendations.

There are several limitations to the present study. First of all, while possessing several advantages over magnitude images for iron quantification, phase image approaches also face limitations. Phase contrast depends on source geometry and orientation with respect to the main magnetic field, and field perturbations extend beyond sources of susceptibility and alter contrast of surrounding tissue. These effects ultimately arise from fundamental physical properties of the magnetic field (e.g., solenoidality) and cannot be fully eliminated. However, unlike quantification of iron in distributed tissue regions (e.g., red nucleus), our localized method is not impacted by such effects and actually exploits them: The $r_\pi$ and $r'_\pi$ image parameters are related to magnetic field intensity on the directionally dependent dipole pattern outside the localized susceptibility source. Advantage is conferred by 1) providing additional dynamic range in pixilated images allowing resolution of very small sources that could not otherwise be resolved. This range can be increased by increasing echo time provided that the concomitant loss in SNR is not too large. 2) Since parameter measurements occur far away from the actual lesion, the shape of the source is less important. Under appropriate circumstances, this permits the assumption of a spherically symmetric source and greatly simplifies quantification and clinical practicality.

Secondly, we have assumed that BMB iron sources are effectively spheres. In most BMB, the actual geometry can likely be ignored because of far field effects. Indeed, this may be reflected in the definition of BMB as "round" hypointense GRE $T_2$*(magnitude) image features by recently proposed BMB rating scale. However, other recommendations allow for "ovoid" hypointensities and it is expected that the spherical geometry assumption may not be globally applicable. However, based on at least three observations, non-spherical effects do not seem to be important in the present study: 1) The average ratio of the π-wrap bounding rectangle in the axial images was 0.99+0.08 suggesting circularity in the equatorial plane. 2) The $r'_\pi/r_\pi$ ratio for the horizontal dipole patterns was consistent with the theoretical value for a spherical source. 3) Under the spherical assumption, the plot of $m_{Fe}$ vs. $r'_\pi$ was strongly linear (FIG. 6).

Thirdly, our method is a linear model based on the assumptions of uniform iron density and susceptibility. In the present study, the very good linear correlation between iron mass and $r'_\pi$ seems to imply that these BMB have a relatively small variance. However, because our BMB represent a small number of cases and a specific disease population, it is not possible to draw conclusions about BMB in other disease states. Therefore, the plot of $m_{Fe}$ vs. $r'_\pi$ (FIG. 4) can only be regarded as a tentative standardization curve of iron content.

Fourth, because sample inclusion before data processing and sample exclusion after processing was based on dipole quality, our results are possibly biased toward best-case scenarios. However, our study analyzed BMB in postmortem tissue slices and in almost all cases, lesions were visible on the surface of the tissue. BMB dipoles in intact brain will not be influenced by issues and artifacts associated with lesion bisection and cut-tissue interfaces. Therefore, dipoles of comparable iron content could likely be better formed than those excluded in our study. In addition, faint excluded dipoles were associated with iron values at or below the sensitivity threshold of the method (~0.3 µg), and thus do not actually contribute to a bias. Finally, background phase distortion is less of an issue in clinical scanners when compared to the experimental hardware used in the present study. In any case, whether in a clinical or experimental context, malformed and ambiguous phase image features are likely to be present. How often these cases occur and to what extent the method is affected must be informed by further research. Finally, in such cases, automated image processing software could still possibly discern essential features from dipole patterns that appear faint and indistinct to the human eye.

Finally, the present study was conducted in postmortem tissue with very small fields of view (2.2 cm) and at very high field 11.7 T. Eq. 8 implies in principle that equivalent $r_\pi$ and $r'_\pi$ values are achievable even with the clinically state of the art 3.0 T magnets. For example, at 3.0 T an echo time of 27 ms is required to get dipoles with the same $r_\pi$ values as this current study (Eq. 8), a value well within current use in BMB detection. However, practical issues concerning questions of adequate SNR and sufficiently short scan times have yet to be addressed with acquisitions using FOVs that are an order of magnitude larger than in the current study.

In summary, these post mortem results demonstrate that real BMB can be accurately related to prominent phase image parameters under the simple assumption that BMB iron sources are spherically shaped. Our $m_{Fe}$ vs. $r'_\pi{}^3$ plot can tentatively be regarded as a standard curve, allowing BMB iron content estimates in tissue states similar to our AD/CAA autopsy cases. In addition, phase image features were used to estimate upper bounds of BMB iron source diameters and lower bounds of iron concentrations. Our method potentially allows the definition of iron load or disease burden indices at the level of a single bleed, to the whole brain (e.g. "the sum of the iron content of all lobar BMB"), as well as the classification of BMB by size unobscured by the blooming effect. A "count, classify and quantify" method can potentially be fully or semi-automated, and results can in principle be compared across field strengths and echo times. Such information can enhance prognostic and diagnostic criteria in the context of cerebral vessel disease associated late onset dementias, as well as inform treatment decisions regarding the use of thrombolytic or thrombotic agents.

In the following study, we applied our methods to small hemorrhagic lesions induced in the in vivo rat brain using bacterial collagenase. As expected by theory, measurements of geometric features in phase images correlated with lesion iron content measured by graphite furnace atomic absorption spectrometry. Iron content estimation following BMB in vivo can shed light on the role and temporal evolution of iron-mediated tissue damage and the efficacy of potential treatments in cerebrovascular diseases associated with BMB.

Animal Procedures

Our animal protocol was approved by the Loma Linda University Institutional Animal Care and Use Committee. Ten male Sprague-Dawley rats (450-500 g) were placed under anesthesia (isoflurane) and positioned in a stereotactic frame (Knopf Instruments, Tujunga, Calif.). A midline incision was made and the scalp was retracted. A small burr hole (~1.5 mm) was drilled into the skull 0.5 mm anterior and 3.1±0.2 mm lateral from bregma. A single dose of type VII bacterial collagenase in saline (Sigma-Aldrich, St. Louis, Mo.) was injected 6.1 mm below the skull surface using a Hamilton syringe (Reno, Nev.) placed in a microsyringe pump (Model 310 Plus Series, KD Scientific, Holliston, Mass.) targeting the caudate/putamen (CP) of the rat brain. A range of collagenase doses (0.11 U/200 nl saline, 0.14 U/200 nl, 0.15 U/200 nl, 0.16 U/200 nl, 0.17 U/200 nl, 0.18 U/200 nl, 0.2 U/200 nl, 0.22 U/200 nl, 0.24 U/200 nl saline) were injected over 5 min. To minimize bleeding of injectate up the needle tract, the needle was held in place for 20 minutes following the injections and then slowly withdrawn at approximately 0.5 mm/min. The burr hole was filled with bone wax, the scalp sutured shut, and the rats were allowed to recover. One animal was euthanized on postoperative day (POD) 2 due to surgical complications and 9 rats underwent MR scanning.

MR Imaging

Rats were scanned POD 28±2 in a 4.7 T small animal MR scanner (Bruker Biospin, Billerica Mass.) using two SWI sequences with the following parameters: 1) 3D coronal SWI: TR/TE: 46.5/25 ms (TR/TE: 39/20 ms for two rats), flip angle: 17°, matrix: 256×256, NEX: 3, FOV: 3.0 cm, in-plane resolution: 117 μm×117 μm, and 32 slices of thickness 0.938 mm. 2) 2D axial SWI: TR/TE: 558.3/25 ms (TR/TE: 1248.8/20 ms for two rats), flip angle: 200, matrix: 256×256, NEX: 6, FOV: 3.0 cm, in-plane resolution: 117 μm×117 μm, slices: 10, 12 or 32 of thickness 0.8 mm.

Lesion Dissection

Immediately following MR scanning, animals were sacrificed by exsanguination by way of transcardial perfusion with 4% buffered paraformaldehyde (PFA). Brains were extracted from the skull and fixed in 4% PFA. The rat brains were sectioned coronally anterior and posterior to the needle tract that was visible at the top of the brain. Additional dissection was performed as necessary to reveal the anterior/posterior lesion boundaries and trim away excess tissue. Sections of tissue surrounding the lesion (ipsilateral CP) and control sections (contralateral CP) were dissected out of the coronal slices using a diamond knife and nylon and titanium forceps (FIG. 7) and weighed on a precision balance.

Figure 7A:
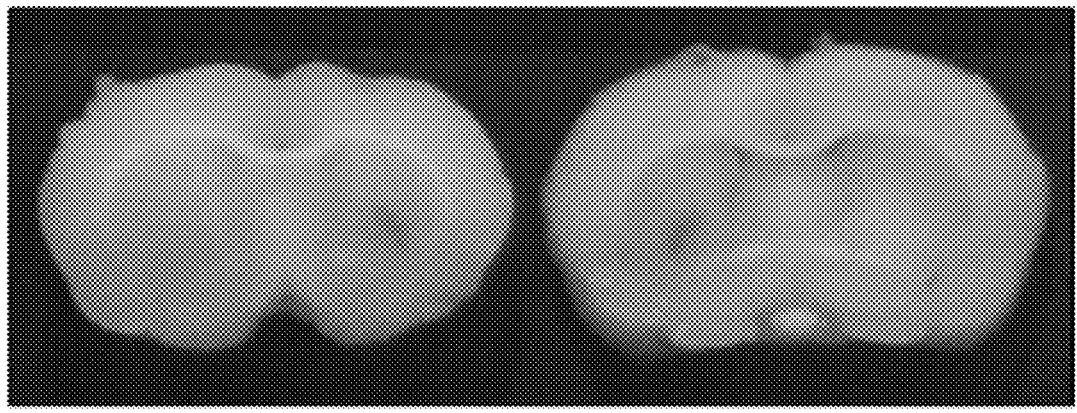
FIG. 7A shows two successive coronal sections of a rat brain with a collagenase-induced bleed in the right caudate/putamen (CP)
Figure 7B:
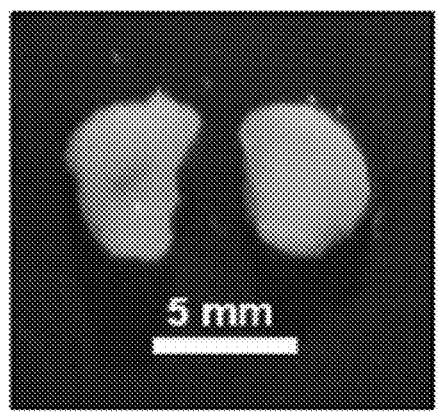
FIG. 7B shows dissected tissue surrounding the bleed taken from the right CP and a control tissue sample taken from the left CP.

FIG. 7A shows two successive coronal sections of a rat brain with a collagenase-induced bleed in the right CP. FIG. 7B shows dissected tissue surrounding the bleed taken from the right CP, and a control tissue sample taken from the left CP.

Iron Content Determination

Samples were wet ashed: blocks (20-70 mg) were dissolved in 250μl of 70% $HNO_3$ overnight, heated at 80° C. for 20 min, and allowed to cool to room temperature. 250 μl of 10M of $H_2O_2$ were added and, after 30 min, samples were heated to 70° C. for 15 min and allowed to cool. Iron concentrations were measured in triplicate by graphite furnace atomic absorption spectrometry (GF-AAS) (SpectrAA 220Z, Varian, Victoria, Australia). Assuming that contra- and ipsilateral CP have comparable background iron concentrations, lesion iron content was calculated using the formula: $m_{(Fe)L}=f_{(Fe)I}m_I-f_{(Fe)C}m_I$, where $m_{(Fe)L}$ is the mass of iron in the lesion, $f_{(Fe)I}(f_{(Fe)C})$ is the w/w Fe concentration of the ipsilateral (contralateral) tissue block; and $m_I$ is the mass of ipsilateral tissue.

Image Processing 3D (2D) raw phase images were high-pass filtered using a 16×32 (32×32) frequency domain filter (39) using SPIN software (SPIN software, MRI Institute, Detroit, Mich.). Magnitude images were multiplied four times by the product of the negative and positive phase mask of reference. The image parameter $r'_\pi$ was obtained using the Vertical dimension of rectangles bounding the coronal phase dipole patterns in the 3D images. However, all gray-scale images were converted to binary images using ImageJ software (NIH) before bounding rectangles were drawn allowing a more objective determination of $r'_\pi$ in one case where the location of the vertical phase wrap was ambiguous (see FIG. 8). Still, a slight ambiguity remained for Case 3 (reflected in the larger uncertainty for $r_\pi'$ in Table 2 (see Appendix A)). Measured $r'_\pi$ values from images acquired with $T_E$=20 ms were scaled by a factor of 1.08 in accordance with Eq. 8 of (38). (Note that 2D images are used for lesion visualization only (FIG. 8))

Figure 8C:
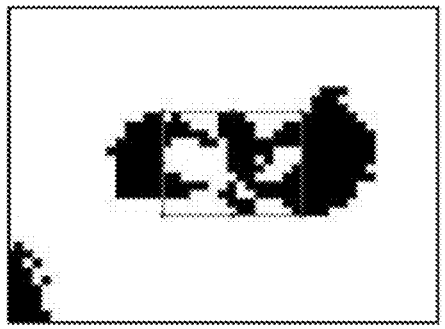
FIG. 8C is binary conversion of FIG. 8B showing distinct black/white phase wraps delineated by a bounding rectangle.
Figure 8F:
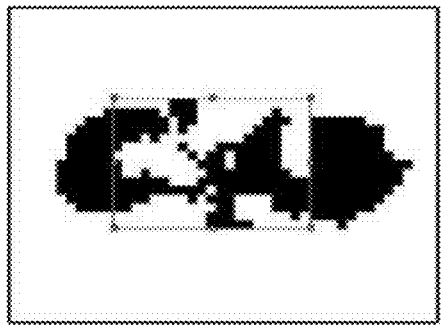
FIG. 8F is binary conversion of FIG. 8E showing distinct black/white phase wraps delineated by a bounding rectangle.
Figure 8B:
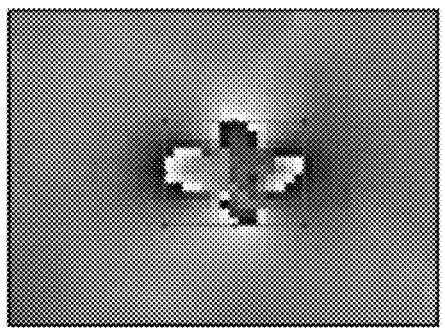
FIG. 8B is a HP image of the dipole shown in FIG. 8A, where the dipole phase wraps are well defined and a bounding rectangle (defined in the binary image of FIG. 8C) is shown superimposed on the HP image.
Figure 8E:
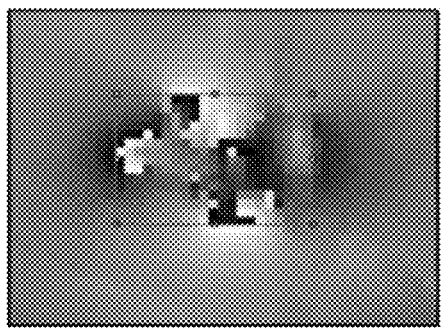
FIG. 8E is an HP image of the dipole shown in FIG. 8D, where the bottom vertical phase wrap is indistinct and a bounding rectangle (defined in the binary image of FIG. 8F) is shown superimposed on the HP image
Figure 8A:
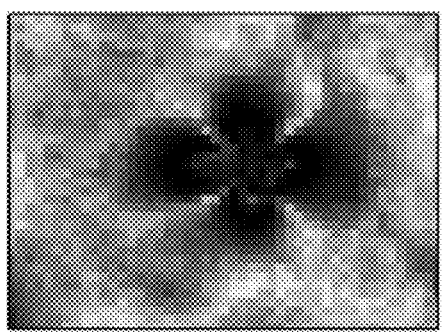
FIG. 8A is a phase enhanced magnitude image of in vivo rat brain showing a well formed dipole.
Figure 8D:
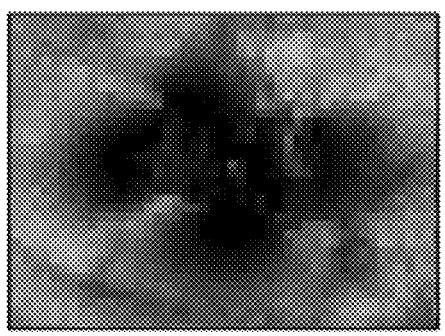
FIG. 8D shows a phase enhanced magnitude image of a less distinct dipole.

FIGS. 8A-8F show the assignment of bounding rectangles in binary images of in vivo rat brain. All high pass filtered phase (HP) images were converted to binary images before bounding rectangles were drawn allowing a more objective determination of r'$_\pi$ for one sample. FIGS. 8A and 8D are phase enhanced magnitude images, FIGS. 8B and 8E are HP images, FIGS. 8C and 8F are binary conversions of FIGS. 8B and 8E from two different cases. In FIGS. 8A and 8B the dipole phase wraps are well defined, whereas the bottom vertical phase wrap in FIG. 8E is indistinct. However, the binary images (FIGS. 8C and 8F), show distinct black/white phase wraps for both samples. The rectangles defined in binary images FIGS. 8C and 8F are shown superimposed on the HP images in FIGS. 8B and 8E.

Statistical Analysis

The relationship predicted by Eq. 6 between BMB iron mass and r'$_\pi$ was tested by linear regression analysis using SigmaPlot version 11 (Systat Software, Inc., Chicago, Ill.). A plot of $(m_{Fe})^{1/3}$ vs. r'$_\pi$ was constructed along with a best-fit least squares regression line. Statistical significance was considered at $p<0.05$. Finally, we note that the independent variable in the regression model is measured with uncertainty. In general, uncertainty in a predictor variable leads to bias in the regression parameters. However, in the present study the slope and intercept are free from bias, and coefficient of determination ($R^2$) is attenuated by <4% (see Appendix B). We report the attenuated value.

Error Analysis

Uncertainties in the plotted variables $(m_{Fe})^{1/3}$ and r'$_\pi$ are given by Eqs. 9-13 (see Appendix A for more details):

$$\delta r'_\pi = (s^2 \delta n_+^2 + \delta n_-^2 + t^2/36^2)^{1/2} \quad [9]$$

$\delta r'_\pi$ is the uncertainty in r'$_\pi$, s is the in-plane voxel dimension parallel to $B_0$, t is the slice thickness, and $\delta n+$ and $\delta n-$ are respectively the uncertainty in number of voxels of the upper and lower edges of the bounding rectangle.

$$\delta(m_{Fe}^{1/3}) = \frac{\delta m_{Fe}}{3 m_{Fe}^{2/3}} \quad [10]$$

$$\delta m_{Fe} = ((\delta m_I)^2 (f_{(Fe)I} - f_{(Fe)C})^2 + m_I^2 ((\delta f_{(Fe)I})^2 + (\delta f_{(Fe)C})^2))^{1/2} \quad [11]$$

$$\delta f_{(Fe)I} = \left(\frac{\alpha}{m_I}\right)\left((m_I + m_s)^2 (STE_{f_{(Fe)I}})^2 + (0.5 f_{(Fe)I})^2 + (\delta m_I)^2\right)^{1/2} \quad [12]$$

$$\delta f_{(Fe)C} = \left(\frac{\alpha}{m_C}\right)\left((m_C + m_s)^2 (STE_{f_{(Fe)C}})^2 + (0.5 f_{(Fe)C})^2 + (\delta m_C)^2\right)^{1/2} \quad [513]$$

$\delta(m_{Fe}^{1/3})$ and $\delta m_{Fe}$ are the uncertainty in $m_{Fe}^{1/3}$ and $m_{Fe}$ respectively, $\alpha$ is a dilution factor and $m_s$ is the mass of $HNO_3$ solution (both required in the GF-AAS iron assay), STE stands for standard error, $\delta m_I$ and $\delta m_C$ are respectively the uncertainty in ipsilateral and contralateral tissue block mass, and all other variables are as defined in the Iron Content Determination section above.

The uncertainty in the predicted iron mass, $\delta \hat{m}_F$, given by Eq. 14 below, is a different kind of uncertainty that can be used to assess how measurement errors in r'$_\pi$ affect how well the linear model compares with the experimental data (see Appendix A):

$$\delta \hat{m}_{Fe} = \left(\frac{6\pi^2 \rho}{V \Delta X B_o T_E}\right) r'^2_\pi \delta r'_\pi \quad [14]$$

Results

Consistent with right CP lesions, right circling behavior, left forelimb paresis, and loss of left whisker reflex was observed in rats in varying degree and duration following surgery. MR images confirmed the presence of these lesions in the CP (FIGS. 9A-9I). Dipole patterns were observed in SWI phase, filtered phase, phase mask, phase-enhanced magnitude, and to a lesser extent, magnitude images. However, when compared to our previous focal quantification studies, the dipole patterns were generally not as distinct nor as symmetric. The lesions were generally more spatially distributed and not spherical, typically elongated in a dorsal-ventral (e.g., see FIG. 7 and FIGS. 9F-9I) and rostral-caudal orientations. One rat was excluded because the lesion dipole pattern was distorted by background phase and image data from 8 animals were analyzed. Iron mass and image parameter data for these animals are shown in Table 2. The median iron mass of the induced BMB was 1.40 µg.

TABLE 2

Collagenase-Induced BMB Image Data

| Subject | $m_{Fe}$ (µg) | $(m_{Fe})^{1/3}$ (µg$^{1/3}$) | r'$_\pi$ (mm) |
|---|---|---|---|
| 1 | 1.19 ± 0.02 | 1.06 ± 0.01 | 0.95 ± 0.05 |
| 2 | 2.19 ± 0.04 | 1.30 ± 0.01 | 1.33 ± 0.05 |
| 3 | 0.76 ± 0.02 | 0.91 ± 0.01 | 0.88 ± 0.07 |
| 4 | 1.33 ± 0.06 | 1.10 ± 0.02 | 0.88 ± 0.05 |
| 5 | 1.47 ± 0.03 | 1.14 ± 0.01 | 1.17 ± 0.05 |
| 6 | 1.19 ± 0.03 | 1.06 ± 0.01 | 1.17 ± 0.05 |
| 7 | 1.74 ± 0.03 | 1.20 ± 0.01 | 1.06 ± 0.05 |
| 8 | 2.41 ± 0.03 | 1.34 ± 0.01 | 1.64 ± 0.05 |

Data is shown for collagenase-induced lesions in the CP of the rat brain.
Iron mass (mFe) was measured using atomic absorption spectrometry.
r'π data was obtained from the vertical dimension (i.e., parallel to B0) of rectangles bounding the coronal dipole phase pattern in binary images.
Uncertainties were calculated using Eqs. 9-13, A1 and A2 as described in the text and Appendix A.

Figure 9E:
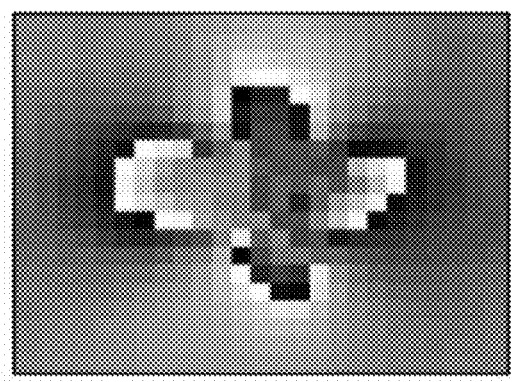
FIG. 9E shows a magnification of the dipole pattern in FIG. 9C.
Figure 9D:
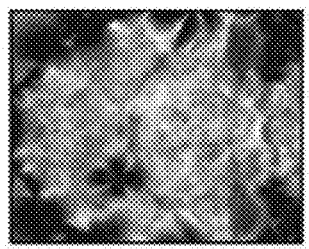
FIG. 9D shows a phase-enhanced magnitude SWI image in coronal orientation of a BMB induced in the caudate/putamen of the living rat brain.
Figure 9I:
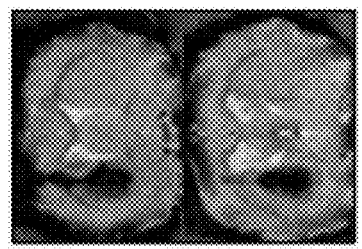
FIG. 9I shows phase-enhanced magnitude SWI images in axial orientation of a BMB induced in the caudate/putamen of the living rat brain (two successive slices are shown)
Figure 9C:
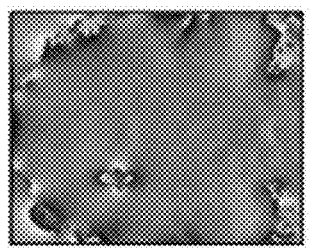
FIG. 9C shows a high pass-filtered SWI image in coronal orientation of a BMB induced in the caudate/putamen of the living rat brain.
Figure 9H:
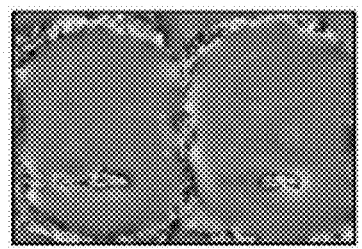
FIG. 9H shows high pass-filtered SWI images axial orientation of a BMB induced in the caudate/putamen of the living rat brain (two successive slices are shown)
Figure 9B:
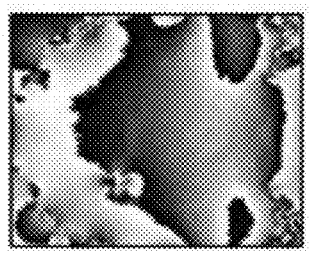
FIG. 9B shows a raw phase SWI image in coronal orientation of a BMB induced in the caudate/putamen of the living rat brain.
Figure 9G:
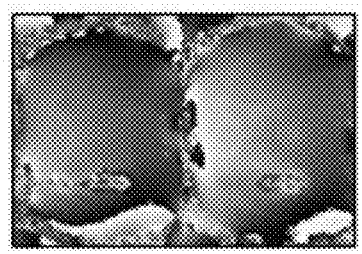
FIG. 9G shows raw phase SWI images in axial orientation of a BMB induced in the caudate/putamen of the living rat brain (two successive slices are shown)
Figure 9A:
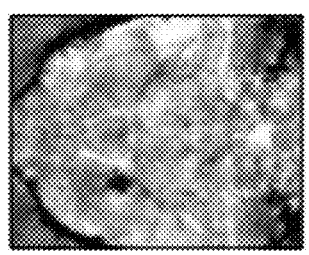
FIG. 9A shows a magnitude SWI image in coronal orientation of a BMB induced in the caudate/putamen of the living rat brain.
Figure 9F:
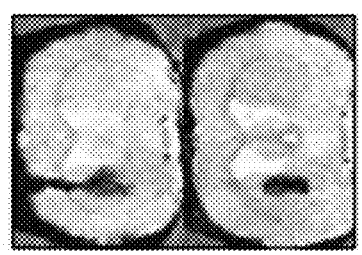
FIG. 9F shows magnitude SWI images in axial orientation of a BMB induced in the caudate/putamen of the living rat brain (two successive slices are shown)

FIGS. 9A-9I show: in vivo axial and coronal SWI scans of collagenase induced BMB. In vivo magnitude (FIGS. 9A and 9F), raw phase (FIGS. 9B and 9G), high pass-filtered (FIGS. 9C and 9H), phase-enhanced magnitude (FIGS. 9D and 9I) SWI images in coronal (FIGS. 9A-9D) and axial orientations (FIGS. 9F-9I) of a BMB induced in the caudate/putamen of the living rat brain (subject 1, Table 2) (two successive slices are shown for axial images). FIG. 9E shows a magnification of the dipole pattern in FIG. 9C. Note the dorsal/ventral elongation of the bleeds in the axial images.

Figure 10:
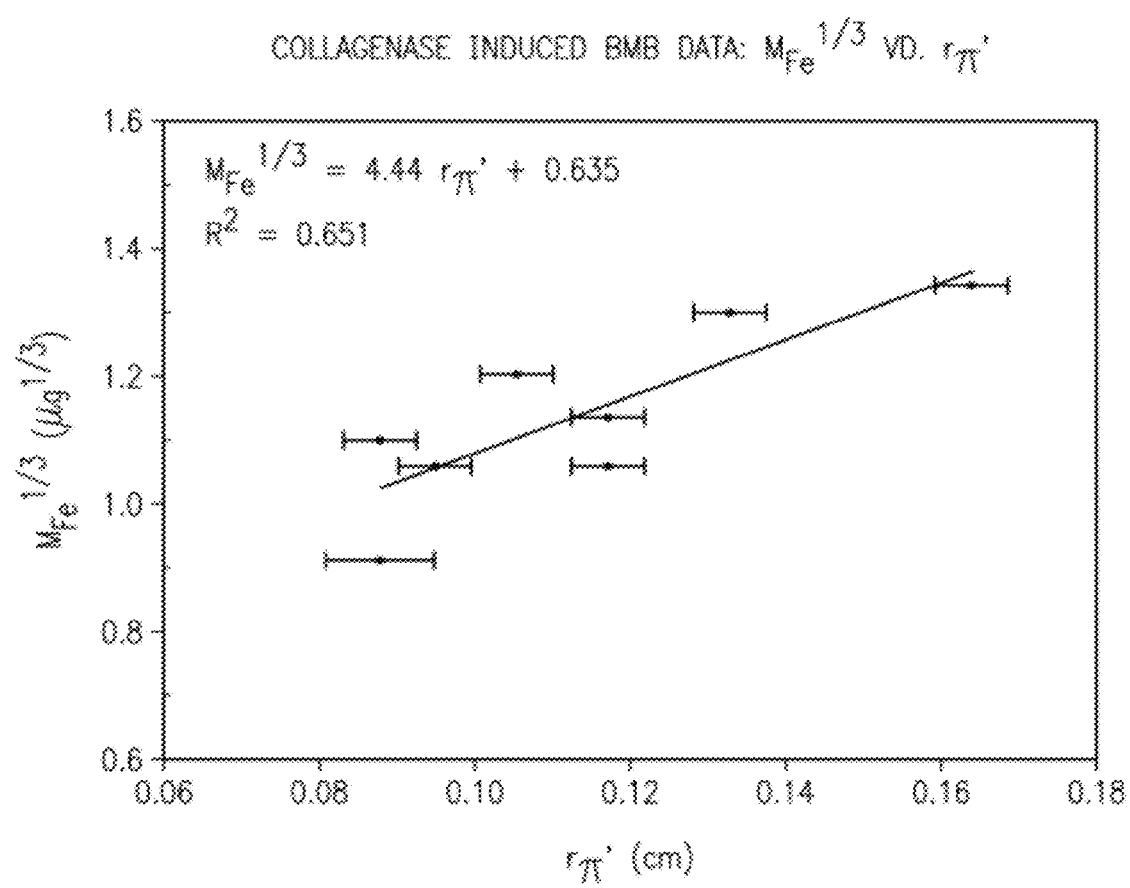
FIG. 10 is a graph showing the cube root of iron mass from collagenase-induced BMB plotted against $r'_\pi$ and FIG. 11 is a flowchart of some steps of a method for automatic quantification of localized sources of magnetic susceptibility.

FIG. 10 shows a graph where the cube root of iron mass from collagenase-induced BMB is plotted against r'$_\pi$. The plot of $m_{Fe}^{1/3}$ vs. r'$_\pi$ revealed a statistically significant linear relationship (attenuated $R^2=0.65$, $p=0.012$) as was expected based on the theory underlying the quantification method. The slope was found to be 4.4 µg/g$^{1/3}$/cm ($p=0.012$) and the intercept, while predicted to vanish, was statistically different from zero (0.64 µg$^{1/3}$, $p=0.005$). The effective mass magnetic susceptibility ($\Delta_\chi/\rho$) of the sample legions was calculated from the slope and found to be $7.2 \times 10^{-6}$ m$^3$/kg, about 5 times larger than reports for human liver ferritin and hemosiderin and about 9 times larger than reported in our postmortem human study. Finally, using the slope of FIG. 10, $\delta \hat{m}_F$ of Eq.

5 was found to range from 0.01 to 0.04 µg, with a mean of 0.02 µg, a standard deviation of 0.01 µg, and a median of 0.02 µg.

Discussion

In the present work, we tested our focal iron quantification technique in a simple collagenase-induced BMB model in the living rat brain. The BMB dimensions were on the order of 1-2.5 millimeters in size and contained 0.8 to 2.4 µg of iron. Thus, the size and iron content of the BMB were relevant to human BMB. Dipole patterns were present in experimentally induced bleeds and were measured for the $r'_\pi$ parameter. A plot of the cube root of lesion iron mass against $r'_\pi$ produced a linear graph as expected by the theory underlying the quantification technique. This can be thought of as a standard curve whereby other BMB could be assayed for iron content in the rat brain.

However, the dipole patterns associated with collagenase hemorrhages were not as distinct as previously observed from BMB in postmortem human brain, nor was the linear correlation relating iron mass and $r'_\pi$ as strong (r=0.81 (attenuated) vs. r=0.99). This is most likely due to less focal bleeding in the present study (FIG. 1 and FIGS. 3F-3I). While an established ICH rat model typically delivers 0.2 U of collagenase in 1 µl of saline, the smaller doses and volumes used in the present study reflect an attempt to induce smaller and more focal hemorrhagic legions to better model BMB. However, it appears the collagenase injections caused more spatially diffuse bleeding than is characteristic of real BMB which generally originate from a single ruptured vessel. Refinements to the BMB induction technique leading to more concentrated lesions and distinct dipoles are possible. For example, diffusion of collagenase through the brain tissue likely contributes to the non-locality including dorsal/ventral and rostral/caudal elongation of the induced lesions. The use of a glass micro needle (which have outer diameters an order of magnitude smaller than the 26 gauge needle used here) and the associated smaller bore needle tract could lead to less diffusion of enzyme away from the injection site and thus more localized bleeding and iron deposition. On the other hand, an alternate model that uses ultrashort laser pulses to induce hemorrhages in targeted single microvessels may offer superior results compared to a collagenase induced BMB model at least for cortical bleeds.

Critical to the validation of the quantification technique is the correlation between BMB iron measured by GF-AAS and the phase image parameter $r_\pi'$. In the living rat brain, lesion susceptibility varies as red cell breakdown, heme degradation and hemosiderin formation evolves. Similarly, in this experiment, the amount of paramagnetic iron detectible by (or "visible" to) the MR scanner is also expected to vary with lesion age. Therefore since GF-AAS always measures the total iron present in the tissue, perfect correlations can only occur if the imaging is done when all the iron extravasated following the BMB is visible. In humans, hematoidin, a marker of free iron release due to hemeoxygenase activity, peaks around POD 10 and hemosiderin deposition peaks around POD 10-14. We chose POD 28 to image and sacrifice the rats assuming that hemosiderin formation would be essentially complete. However, one possible explanation for the unexpected non-zero intercept in the plot of FIG. 10 is the presence of non-MR visible iron. A longitudinal study design with 1) multiple time point extending beyond POD 28, and 2) with an additional component investigating the magnetic and biochemical properties of lesion iron and associated molecules in the tissue, could shed further light on how lesion iron accumulation, concentration, magnetic properties and MR-visibility vary over time.

The non-zero intercept in FIG. 10 suggests that not all iron is accounted for by $r_\pi'$ measurements. Examination of Table 2 and FIG. 10 reveals that the mass of iron associated with point pairs with similar or equal $r'_\pi$ values differ by ~0.3-0.6 µg. This suggests that the sensitivity of the technique at this image resolution may also contribute to the non-zero intercept. However, the largest uncertainty of predicted iron mass ($m_{Fe\ hat}$) for our 8 cases was found to be ~0.04 µg, over six times smaller than that implied by intercept of 0.64 µg$^{1/3}$. Therefore, discreet voxel size alone may not explain the discrepancy. Besides a contribution from non-visible iron discussed above, an alternate possibility is that the single $r_\pi'$ parameter only approximates the iron content of non-spherical lesions. Finally, another point of interest consequent from FIG. 10 is the difference in lesion mass susceptibility compared with human liver hemosiderin and our postmortem study. Whether this results from differences in species, bleeding mode, artifacts of fixation on tissue and lesion susceptibility, or other factors is an important question that calls for further study.

In conclusion, we have shown that an SWI phase image method can be used to estimate focal iron content on the order of a few micrograms in the living rodent brain using simple modifications of an established collagenase ICH model. Improvements to the experimental technique or the use of alternate bleeding models are expected to produce superior results and could further increase the usefulness of the technique in animal models. This will allow investigation of the temporal progression of bleeding lesions and the role of iron-mediated tissue damage and the efficacy of therapeutic interventions in small cerebral vessel disease associated with BMB.

Method Description

Figure 11:
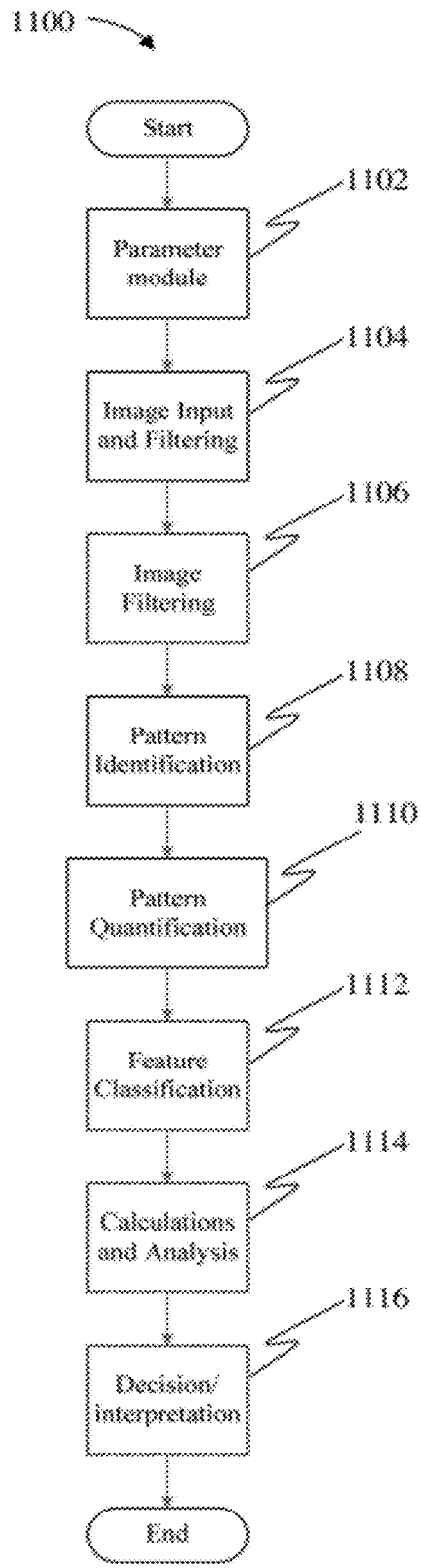

Referring now to FIG. 11, there is shown a semi-automated software method is provided for the quantification of localized iron sources in brain microbleeds (BMB) using magnetic resonance phase images. The iron sources are considered to be spherical iron deposits in the BMB. By "quantification of . . . iron" we mean i) quantification of the mass of iron in the BMB, and ii) quantification of the "true" (i.e., apart for the blooming effect) effective iron source diameter.

The quantification and analysis software system consists of the modules below. As per common software engineering practice, these modules can be implemented in object oriented code as base classes from which more specialized variations of the modules can be derived (thus, while we use the term 'modules' for simplicity, 'family of modules' is a better description). The modules are organized into a "pipeline" framework that sequentially processes the modules (in the order of there appearance below: Steps 1 through 8). However, only Steps 1, 2, 4 and 5 are required for a processing run and the remaining modules are optional. Finally, we note that the object-oriented framework design allows the system to be easily extended so that new functionality can be added as is deemed useful for specific applications of the method. We therefore discuss the function or features of each module in general terms and then offer specific examples of functionality. The modules are as follows:

1. Parameter Module

The parameter module 1102 contains values for various parameters used to process all modules in the pipeline. The most important set of parameters are the equation coefficients used to calculate iron mass based on image measurements. These are the coefficients in equation 6 described above. These coefficients can be obtained using standard curves of BMB iron vs. phase image parameters as described above. Other parameters, for example, specify which specific calculation and analysis modules to use in process run. The user selects the parameters at the beginning of processing from a graphical user interface (GUI).

2. Image Input and Filtering

A standard image library (e.g., ITK) is used to read a processed MR phase image stack into the pipeline framework 1104. The image stack can be processed as i) a set of two dimensional (2D) images, or ii) merged into a single three dimensional (3D) volume. If the images do not contain isotropic voxels, interpolation using standard methods must be performed for case ii.

3. Image Filtering

Various filters can be applied to the image data 1106 before the pattern identification step. For example, an 'image layer' identifying anatomical brain regions can be imported to or drawn on an image stack.

4. Pattern Identification

Dipole pattern identification 1108 is accomplished using variations of the 2D (case i, Step 2) or 3D (case ii, Step 2) PDQ (Phase map cross-correlation Detection and Quantification) method described by Mills et al. (Mills PH, Wu Y-JL, Ho C, Ahrens ET. Sensitive and automated detection of iron-oxide-labeled cells using phase image cross-correlation analysis. Magnetic Resonance Imaging 2008; 26(5):618-628.), which is incorporated herein by reference in its entirety. In this method the distinct dipole 'burger' shape is used as a template and systematically overlaid onto every template-sized area of the phase image (see e.g., FIGS. 1 and 3 above for examples of dipole patterns in modeled or real BMB, and FIG. 2 of the Mills et al. reference for examples of 2D and 3D templates used by the PDQ method). The similarity between the template and image patch is given a score based on a cross-correlation formula. An essential variation of the method for our application is instead of a single template, multiple templates, each scaled according to $r'_\pi$ are passed over the image and scored. Because the right-sized template will have the highest score, an image feature (i.e., a putative dipole pattern) is matched based not only on mere presence of a dipole, but also on iron content. A second variation is the use of circular template for axial oriented images. The radius of this template is scaled by various parameters: $d^*$, $r_\pi$, $r_{3\pi}$, $r_{5\pi}$, etc., that can be used to estimate the value or range of the effective iron source diameter (unobscured by the 'blooming effect'). The degree of matching is scored using a numerical scale where zero represents no correlation to a particular template and 100 is a perfect match—that is the image feature and the dipole template are identical. Score threshold values are used to decide if the image feature is identified as a dipole pattern within an acceptable tolerance. In a borderline case, the feature is determined a 'possible' dipole pattern and is flagged for manual inspection. For example, a score of 80 or greater could be considered a dipole and a score between 50 and 55 a possible dipole. Once a feature is identified as a dipole, a record is created in a database that stores information about the feature.

5. Pattern Quantification

The scale of such dipole templates (e.g., quantified by $r_\pi'$, $d^*$, or bounded by $r_{3\pi}$, etc.) can be related to iron content and effective iron source diameter as described above. In the Pattern Identification module 1108 each of the dipole pattern templates is associated with the proper $r_\pi'$ and/or $d^*$, etc. In this Pattern Quantification module 1110, an image feature is assigned an iron content level, effective diameter, upper-bound diameter, and/or diameter range (depending on the application), based on the template that best matches the image feature. In other words, e.g. the $r_\pi'$ value from the template with the largest score is assigned to the image feature and then the iron content is calculated based on $r_\pi'$ using equations and parameters in the Parameter module 1102. Relevant quantification information is added to the database for the image feature.

6. Feature Classification

After image features are automatically identified and quantified, they can be classified 1112 based on what the system "knows" about the identified features: what is in the database and Parameter module 1102 data structures, and what is communicated through instantiated objects of specific Feature Classification 1112 classes. For example, if anatomical regions are mapped to an image stack through an Image Filter object (as described in Step 3 above), a Feature Classification instance can be used to automatically classify identified image features by e.g., brain lobe or nucleus, and associate an appropriate "tag" with the feature. For example, a location tag such as "Parietal Lobe" can be associated with a feature identified in the parietal lobe of the brain. All classification information and tags are stored in the database.

a) Object Classification

After image features are automatically identified and quantified, object classification proceeds on two levels: 1) Automated classifications are done based on what the system 'knows' about the identified features: what is in the database and Parameter module 1102 data structures, and what is communicated through instantiated objects of specific Object Classification classes. For example, if anatomical regions are mapped to an image stack through an Image Filter object (as described in Step 3 above), an Object Classification instance can be used to automatically classify identified image features by e.g., brain lobe or nucleus. 2) Information can also be supplied by the user. For example, following Step 5 the image stack, marked with each identified feature, can be presented to the user. The user can then manually associate the feature with any number of tags. For example, a location tag such as "Parietal Lobe" can be associated with feature identified in the parietal lobe of the brain. All tags and automatic classifications are stored in the database.

7. Calculations and Analysis

This family of modules 1114 is used to perform calculations and analysis using information stored in the database. For example, the system can be queried to add the total iron content of all BMB in the parietal lobe, or calculate the average diameter of all the BMB in posterior brain regions. Similar information could potentially be valuable if it can be shown to be biologically or clinically relevant. Such queries can be initiated automatically in the pipeline, or manually from the GUI at the end of processing.

8. Decision/Interpretation

Based on output from the Calculations and Analysis modules 1116 various conditional criteria can be used to output a decision, interpretation or conclusion. For example, if the total iron content in a certain brain location falls between two particular threshold values, an output string of "Moderate Iron Extravasation" could be assigned and displayed in the GUI. Alternately, an event could be triggered that would send an email alert informing medical staff of a condition that requires further attention. Ultimately, if validated by future clinical research, one could hope that tentative diagnostic information or therapeutic guidelines could be suggested by a future implementation of this module.

In another embodiment of the present invention there is presented an automated method for quantification of localized sources of magnetic susceptibility. The method can be used in various image types and in different problem domains. What is essential is a dipole pattern that represents a magnetic field induced in a material by an external magnetic field that can be imaged and analyzed. What is described herein is an automated method in the specific context of quantifying iron content and effective iron source diameter in phase images of BMB as an example of how the method can be used. However, other localized sources of paramagnetic or diamagnetic material may similarly be quantified in other applications (e.g., medical, industrial, etc). Therefore, this example is not meant to be limited only to BMB or medical imaging as will be appreciated by those with skill in the art with reference to this disclosure.

This example of the present invention demonstrates an automated method for quantification of localized iron sources in brain microbleeds (BMB) using magnetic resonance phase images. The iron sources are generally spherical iron deposits in the BMB. The term "quantification of . . . iron" means: i) quantification of the mass of iron in the BMB, and ii) quantification of the "true" effective iron source diameter. The background for the method for quantification can be found in: *Quantification of punctate iron sources using magnetic resonance phase*, Magn Reson Med 2010 63(1): 106-115; *Iron quantification of microbleeds in postmortem brain*, Magn Reson Med 2011; 65(6): 1592-601; and *In vivo Iron Quantification in Collagenase-induced Microbleeds in Rat Brain*, Magn Reson Med 2011; June 30, each of which are incorporated by reference in their entirety.

The method can be implemented in object oriented code as base classes that more specialized variations of the modules can be derived. The object-oriented framework design provides flexibility so that the method can be easily extended to add new functionality as will be understood by those with skill in the art with reference to this disclosure. Therefore the function or features of each module are described in general terms and specific examples of functionality but are not meant to limit other possible variations of the method.

Referring now to FIG. 10, there is shown a flowchart of an automated method for detection and quantification of localized sources of magnetic susceptibility in images. As can be seen, the method comprises computer instructions retrievable from a storage and executable on a processor for executing a parameter module, an image input and filtering module, a pattern identification, and a pattern quantification module. Optionally, the method can comprise a pattern quantification module, a feature classification module, a calculations and analysis module, and a decision/interpretation module.

Parameter Module

The parameter module comprises instructions for holding global values and parameters used in all the modules. The most important set of parameters are the equation coefficients used to calculate iron mass based on image measurements. These are the coefficients in equation 6 from Iron quantification of microbleeds in postmortem brain. These coefficients can be obtained using standard curves of BMB iron versus phase image parameters. Other parameters can specify a specific calculation and optionally one or more than one analysis module to use in processing the provided data. A user sets the parameters at the beginning of processing using a graphical user interface (GUI).

Image Input and Filtering Module

A standard image library (e.g., ITK) is used to read a processed MR phase image stack into the pipeline framework 1104. The image stack can be processed as: i) a set of two dimensional (2D) images, or ii) merged into a single three dimensional (3D) volume. If the images do not contain isotropic voxels, interpolation using standard methods must be performed for case ii.

Image Filtering Module

Various filters can be applied to the image data before step 4. For example, an "image layer" identifying anatomical brain regions can be imported or drawn on an image stack.

Pattern Identification

Dipole pattern identification is accomplished using variations of the 2D or 3D Phase map cross-correlation Detection and Quantification (PDQ) described in Sensitive and automated detection of iron-oxide-labeled cells using phase image cross-correlation analysis, Magnetic Resonance Imaging 2008; 26(5):618-628, which is incorporated by reference in its entirety. A distinct dipole "burger" shape is used as a template and systematically overlaid onto every template-sized patch of the phase image (see Figs 1 and 3 from Quantification of punctate iron sources using magnetic resonance phase and Figs 1 and 3 from Iron quantification of microbleeds in postmortem brain for examples of dipole patterns in modeled or real BMB, and Fig 2 of Sensitive and automated detection of iron-oxide-labeled cells using phase image cross-correlation analysis for examples of 2D and 3D templates). The system calculates a score based on a cross-correlation formula of similarity between the template and image patch. In a preferred embodiment, an essential variation of this method is used. Unlike previous systems that used a single template, the present invention uses multiple templates, each scaled according to $r\pi'$. The multiple templates are passed over the image and scored. The template with the correct size will have the highest score. An image feature (i.e., a putative dipole pattern) is matched based not only the presence of a dipole, but also on iron content. In another embodiment a circular template is used for axial oriented images. The radius of this template is scaled by various parameters ($d^*$, $\pi r$, $r3\pi$, $r5\pi$, etc.) that can be used to estimate the value or range of the effective iron source diameter unobscured by any 'blooming effect' present in the image. The degree of matching is scored using a numerical scale where zero represents no correlation to a particular template and 100 is a perfect match—that is the image feature and the dipole template are identical. If the score falls above a threshold value that is set by the user in the parameter module, the feature is identified as a dipole pattern and assigned a quantification parameter ($d^*$, $r\pi$, etc.) associated with the template. If the score is found to be above the threshold for more than one template, the template with the highest score is chosen. In this way, the "best fit" quantification parameter is assigned to the feature. It is important to note that the choice of the threshold value will affect the sensitivity and specificity of dipole identification and parameter assignment. Because different applications of the method might necessitate different e.g. sensitivities, the user is allowed to set the threshold before the analysis begins. However, a threshold that corresponds to an 80% sensitivity in the determination of best fit templates from a standard image set (distributed with the software and containing various dipoles patterns) is used as a default value. Once a feature is identified as a dipole and associated with the appropriate parameter, a record is created in a database that stores information about the feature.

Pattern Quantification Module

As described in *Quantification of punctate iron sources using magnetic resonance phase*, Magn Reson Med 2010; 63(1): 106-115; *Iron quantification of microbleeds in postmortem brain*, Magn Reson Med 2011; 65(6):1592-601; and *In vivo Iron Quantification in Collagenase-induced Microbleeds in Rat Brain*, Magn Reson Med 2011; June 30, each of which is incorporated by reference in its entirety, the scaling dipole templates (e.g., quantified by $r\pi'$, $d^*$, or bounded by $r3\pi$, etc.) can be related to iron content and effective iron source diameter.

In the Pattern Identification module, each of the dipole pattern templates is associated with the proper quantification parameter ($r\pi'$ and/or $d^*$, etc). In this Pattern Quantification module, an image feature is assigned an iron content level, effective diameter, upper-bound diameter, and/or diameter range (depending on the application), based on this parameter. In other words, e.g. the $r\pi'$ value from the best fit template is used, along with appropriate equations of and values in the Parameter module, to calculate the iron content of the image feature. Relevant quantification information for the feature is then added to the database.

The system can optionally comprise a pattern identification module, a pattern quantification module, a calculations and analysis module and a decision/interpretation module. Although these modules are specific to BMB, other modules are possible for other image types and domains.

Feature Classification

After image features are automatically identified and quantified, they can be classified based on what the system "knows" about the identified features: what is in the database and Parameter module data structures, and what is communicated through instantiated objects of specific Feature Classification classes. For example, if anatomical regions are mapped to an image stack through an Image Filter object (as described in Step 3 above), a Feature Classification instance can be used to automatically classify identified image features by e.g., brain lobe or nucleus, and associate an appropriate "tag" with the feature. For example, a location tag such as "Parietal Lobe" can be associated with a feature identified in the parietal lobe of the brain. All classification information and tags are stored in the database.

Calculations and Analysis

This family of modules is used to perform calculations and analyses using information stored in the database. For example, the system can be set to automatically add the total iron content of all BMB in the parietal lobe, or calculate the average diameter of all the BMB in posterior brain regions. Similar information could potentially be valuable if it can be shown to be biologically or clinically relevant.

Decision/Interpretation

Based on output from the Calculations and Analysis modules various conditional criteria can be used to output a decision, interpretation or conclusion. For example, if the total iron content in a certain brain location falls between two particular values, an output string of "Moderate Iron Extravasation" could be assigned and displayed in the GUI. Alternately, an event could be triggered that would send an email alert informing medical staff of a condition that requires further attention. Ultimately, if validated by future clinical research, one could hope that tentative diagnostic information or therapeutic guidelines could be suggested by an implementation of this module.

Extension to Other Magnetic Materials and Other Application Areas

The present invention has been discussed in considerable detail with reference to certain preferred embodiments, other embodiments are possible. For example, we have described the semi-automated method in the specific context of quantifying iron content and effective iron source diameter in phase images of BMB. However, more generally, the same method can be used for other localized sources of magnetic susceptibility, in other image types, and in different problem domains. What is essential is a dipole pattern that represents a magnetic field induced in a material by an external magnetic field. Therefore, localized sources of paramagnetic or diamagnetic material may similarly be quantified in other medical or industrial applications. Accordingly, the scope of the appended claims should not be limited to the description of preferred embodiments contained in this disclosure. All references cited herein are incorporated by reference in their entirety.

What has been described is a new and improved system and method for a remote control for portable electronic devices that is simple operate and operable with a single hand, overcoming the limitations and disadvantages inherent in the related art.

Although the present invention has been described with a degree of particularity, it is understood that the present disclosure has been made by way of example. As various changes could be made in the above description without departing from the scope of the invention, it is intended that all matter contained in the above description or shown in the accompanying drawings shall be illustrative and not used in a limiting sense.

APPENDIX A

First order uncertainties were determined using standard techniques.

$$\delta r_\pi' = ((s\delta n)^2 + t^2/36^2)^{1/2} \quad [A1]$$

$$\delta n = (\delta n_+^2 + \delta n_-^2)^{1/2} \quad [A2]$$

$$\delta (r_\pi')^3 = 3(r_\pi')^2 \delta r_\pi' \quad [A3]$$

The uncertainties in $r_\pi'$ and $r_\pi'^3$ ($\delta r_{90}'$ and $\delta r_\pi'^3$ respectively) due to the discreet nature of the voxels are given by Eqs. A1-A3. All variables have previously been defined in the text, except $\delta n$, the uncertainty in the number of voxels in the bounding rectangle in the direction parallel to $B_0$. The second term in Eq. A2 involves the slice thickness t. $\delta n_+ = \delta n_-$ was taken to be 0.5, except for one case where the lower phase wrap was slightly ambiguous and $\delta n_-$ was taken as 1.0. Eq. 9 follows from Eqs. A1-A2. The uncertainty in lesion iron mass ($\delta m_{Fe}$ and $\delta m_{Fe}^{1/3}$) was previously expressed by Eqs. 10-13 in the text. $\delta m_I$ and $\delta m_C$ in these equations is related to the precision of the mass balance used to determine tissue block mass.

The above uncertainties are associated with the measured and plotted variables in this experiment. The uncertainty in the predicted iron mass due to measurement error in $r_\pi'$ expressed by Eq. 6 and Eq. A3.

Finally, we note that uncertainty in $r_\pi'$ due to white noise was generally an order of magnitude lower than that due to discrete voxel size in this study and was thus neglected.

APPENDIX B

Due to the finite voxel size in our experiment, the true $r_\pi'$ (which we denote as $r_\pi'^*$) is unknown and we perform the regression using a surrogate variable—i.e., $r_\pi'$. These variables are related by Eq. A4:

$$r_\pi'^* = r_\pi' \pm \delta r_\pi'^* \quad [A4]$$

where $\delta r_\pi'^*$ is the estimated uncertainty in the unobserved variable. $\delta r_\pi'^*$ is due to the finite voxel size and is independent of $r_\pi'$ measurements, therefore Eq. A4 represents an unbiased Berkson error model. In such a model the regression coefficients are not biased, but there is an increase in the residual variance, given by Eq. A5, and a corresponding decrease in $R^2$ seen in Eq. A6 (41,51):

$$\sigma_\epsilon^2 \to \sigma_\epsilon^2 + \beta^2(\delta r_\pi'^*)^2 \quad [A5]$$

$$R^2 \to R^2 - \frac{\beta^2(\delta r_\pi'^*)^2}{\sigma_{m1/3}^2} \quad [A6]$$

Here $\sigma_\epsilon^2$ and $\sigma_{m1/3}^2$ are the residual and total variance respectively, $\beta$ is model coefficient, and the second terms in Eqs. A4 and A6 represent the increase and decrease due to error of the residual variance and regression coefficient ($R^2$), respectively. For the present study, the last term of Eq. A6≈$(4.4^2)(0.005^2)/(0.0195^2)$=0.025. This represents a <4% decrease in from the naive $R^2$=0.68 to 0.65 (the attenuated $R^2$). We thus conclude that in the present study the slope and intercept are free from bias and the effect of error on the regression coefficient is small. Finally, we note that the attenuation depends on the square of $\delta r_\pi'^*$. Thus, decreased in-plane resolution and slice thicknesses result in smaller attenuations (e.g., $\delta r_\pi'^* \to (0.5)(\delta r_\pi'^*)$) leads to an attenuation of 0.01 or <2% in the present case.

What is claimed is:

1. A method for detection and quantification of localized sources of magnetic susceptibility in magnetic resonance scan images obtained from a patient, the method comprising the steps of:
   subjecting a patient to scan by a magnetic resonance imaging device, whereby a phase image of an anatomical region of the patient is obtained;
   identifying a dipole pattern in the phase image corresponding to a localized iron source in the anatomical region;
   measuring one or more than one image parameter of the dipole pattern, wherein the one or more than one image parameter is related to a localized iron source;
   relating, using a computer, the one or more than one image parameter from the measuring to a quantity of iron contained in the localized iron source or a concentration of iron in the localized iron source, wherein the relating comprises:
   a) providing computer instructions for:
   1) a parameter module comprising values for various parameters used in all modules, where the values comprising equation coefficients are used to calculate iron mass based on image measurements;
   2) an image input and filtering module comprising instructions from a standard image library to read a processed magnetic resonance scan into a storage for further processing;
   3) a second image filtering module comprising instructions for identifying anatomical regions;
   4) a pattern quantification module comprising instructions for scaling dipole templates;
   5) a pattern identification module, where the pattern identification comprises instructions for dipole pattern identification;
   6) a feature classification module that comprises instructions to automatically identify, quantify and classify image features;
   7) a calculations and analysis module, where the calculations and analysis module comprises instructions to perform calculations and analyses using information stored in a database; and
   8) a decision/interpretation module, where the decision/interpretation module comprises instructions for analyzing inputs from the calculations and analysis modules to output a decision, interpretation or conclusion, and
   outputting, from the computer, the decision, interpretation or conclusion.

2. The method of claim 1, where the equation coefficients are derived using standard curves of brain microbleed iron versus phase image parameters.

3. The method of claim 1, where the parameters comprise indicators of specific calculations and analysis modules to use in the next steps of the method.

4. The method of claim 1, where the parameters are set by a user prior to processing.

5. The method of claim 1, where the parameters are set by the user using a graphical user interface.

6. The method of claim 1, where the instructions for the image input and filtering module further comprises computer instructions to process the image stack, the steps comprising:
   i) instructions for processing a set of two dimensional (2D) images; and
   ii) instructions for merging the image stack into a single three dimensional volume.

7. The method of claim 6, where the image input and filtering module further comprises computer instructions for determining if the image stack contains isotropic voxels.

8. The method of claim 7, where the step of determining if the image stack contains isotropic voxels for the instructions for merging the image stack into a single three dimensional volume comprise standard methods of interpolation.

9. The method of claim 1, where the instructions for the image filtering module can be executed prior to other steps of the method.

10. The method of claim 1, where the instructions for the pattern quantification module further comprises instructions for relating iron content and effective iron source diameter to the scaled dipole templates.

11. The method of claim 1, where the instructions for scaling dipole templates are quantified by $r\pi'$, $d^*$, bounded by $r3\pi$, or any combination thereof.

12. The method of claim 11, where the instructions for the pattern identification module associate each of the dipole pattern templates with a quantification parameter.

13. The method of claim 12, where an image feature is assigned from the group consisting of an iron content level, an effective diameter, an upper-bound diameter, and a diameter range.

14. The method of claim 1, where the instructions for dipole pattern identification comprise instructions for using a template comprising a distinct dipole "burger" shape that is systematically overlaid onto every template-sized patch of a phase image.

15. The method of claim 1, where the similarity between the template and image patch is scored using a cross-correlation formula.

16. The method of claim 1, where the similarity between the template and image patch is scored using a cross-correlation formula and multiple templates, each scaled according to $r\pi'$.

17. The method of claim 1, where the similarity between the template and image patch is scored using a circular template for axial oriented images.

18. The method of claim 17, where the radius of the circular template is scaled by one or more than one parameters to estimate the value or range of the effective iron source diameter unobscured by the 'blooming effect'.

19. The method of claim 18, where the radius of the circular template is scaled by parameters selected from the group consisting of $d^*$, $r\pi$, $r3\pi$ and $r5\pi$.

20. The method of claim 17, where the degree of matching is scored using a numerical scale, where zero represents no correlation to a particular template and 100 represents that the image feature and the dipole template are identical.

21. The method of claim 20, further comprising the step of determining if the score falls above a threshold value that is set by the user in the parameter module.

22. The method of claim 21, where if the score is found to be above the threshold for more than one template, the template with the highest score is chosen.

23. The method of claim 1, where the classification of image features is based on information stored from the previous modules.

24. The method of claim 23, where the stored information of the identified features is selected from the group consisting of parameter module data, parameter module data structures, and instantiated objects of specific feature classification classes.

25. The method of claim 1, where the calculations are selected from the group consisting of total iron content of all BMB in the parietal lobe and average diameter of all the BMB in posterior brain regions.

26. The method of claim 1, where the output can be a string of "Moderate Iron Extravasation" that is stored and displayed on a monitor.

27. The method of claim 1, where the output is an email alert informing medical staff of a condition that requires further attention.

28. The method of claim 1, wherein the phase image is obtained from an in vivo magnetic resonance scan.

29. The method of claim 1, wherein the phase image is a raw phase image, a high-pass filtered phase image or phase-enhanced magnitude image.

30. The method of claim 1, wherein the dipole pattern is in an orientation selected from the group consisting of a horizontal orientation, a coronal orientation, or an axial orientation.

31. The method of claim 1, wherein the dipole pattern is identified using one or more than one matching template.

32. The method of claim 1, wherein image parameters $r_\pi$ and $r'_\pi$ are determined from a rectangle bounding the dipole pattern, the rectangle comprising a width and a height, where $r_\pi$ is one half of the width and $r'_\pi$ is one half of the height of the bounding rectangle.

33. The method of claim 32, further comprising converting gray-scale high pass filtered phase images to binary images before drawing bounding rectangles.

34. The method of claim 1, wherein the image parameter is related to the mass of iron, the iron concentration or the diameter of the localized iron source.

35. The method of claim 1, wherein the anatomical region is a brain, and wherein the patient has a condition selected from the group consisting of ischemic stroke, hemorrhagic stroke, cerebral amyloid angiopathy, neurotrauma, Alzheimer's disease, vascular dementia, cognitive decline, hypertension, and aging.

36. The method of claim 1, wherein the localized iron source corresponds to a brain microbleed.

37. The method of claim 36, further comprising categorizing a condition severity based on the quantity of iron determined.

38. The method of claim 37, further comprising repeating steps of the method at a later time point to monitor a change in the condition severity.

* * * * *

UNITED STATES PATENT AND TRADEMARK OFFICE
CERTIFICATE OF CORRECTION

PATENT NO.        : 9,076,196 B2
APPLICATION NO.   : 13/426449
DATED             : July 7, 2015
INVENTOR(S)       : McAuley et al.

It is certified that error appears in the above-identified patent and that said Letters Patent is hereby corrected as shown below:

In the Specification

In column 2 at line 62, Change "$2r_\pi$;" to --$2r'_\pi$;--.

In column 2 at line 66, Change "$2r_\pi$" to --$2r_\pi$,--.

In column 4 at line 50, Change "$r'_\pi$" to --$r'_\pi$;--.

In column 6 at line 49, Change "$r_\pi$" to --$r_\pi$,--. (First Occurrence)

In column 7 at line 11, Change "n-wrap" to --π-wrap--.

In column 7 at line 50, Change "$r'_\pi$" to --$r'_\pi$,--.

In column 11 at line 28, Change "$2r_{3\pi}$," to --$2r_{3\pi}$--.

In column 12 at line 14, Change "+2" to --±2--.

In column 14 at line 26, Change "0.99+0.08" to --0.99±0.08--.

In column 16 at line 5, Change "200," to --20°--.

In column 16 at line 32, Change "250µ1" to --250 µl--.

In column 17 at line 46, Change "$\delta m_{Fe} = ((\delta m_I)^2 (f_{(Fe)I} - f_{(Fe)C})^2 + m_I^2((\delta f_{(Fe)I})^2 + (\delta f_{(Fe)C})^2))_{1/2}$" to --$\delta m_{Fe} = ((\delta m_I)^2 (f_{(Fe)I} - f_{(Fe)C})^2 + m_I^2((\delta f_{(Fe)I})^2 + (\delta f_{(Fe)C})^2))^{1/2}$--.

In column 23 at line 25, Change "2010" to --2010;--.

In column 26 at line 48, Change "($\delta r_{90}$'" to --($\delta r_\pi$'--.

In column 27 at line 36, Change "($_\delta r_\pi$'*)" to --($\delta r_\pi$'*)--.

In the Claims

In column 30 at line 17, In Claim 32, change "$r_\pi$and $r'_\pi$are" to --$r_\pi$ and $r'_\pi$ are--.

In column 30 at line 19, In Claim 32, change "$r_\pi$is" to --$r_\pi$ is--.

In column 30 at line 19, In Claim 32, change "$r'_\pi$is" to --$r_\pi$ is--.

In column 30 at lines 30-31, In Claim 35, change "Alzheimer' s" to --Alzheimer's--.

Signed and Sealed this
Eighth Day of March, 2016

Michelle K. Lee
*Director of the United States Patent and Trademark Office*